United States Patent
Kramer et al.

(10) Patent No.: US 10,508,950 B2
(45) Date of Patent: Dec. 17, 2019

(54) TRANSPARENT MEASURING PROBE FOR BEAM SCANNING

(71) Applicant: Primes GmbH Meßtechnik für die Produktion mit laserstrahlung, Pfungstadt (DE)

(72) Inventors: Reinhard Kramer, Pfungstadt (DE); Otto Märten, Dreieich (DE); Stefan Wolf, Groß-Gerau (DE); Roman Niedrig, Berlin (DE)

(73) Assignee: Primes GmbH Mebtechnik fur die Produktion mit Laserstrahlung, Pfungstadt (DE)

( * ) Notice: Subject to any disclaimer, the term of this patent is extended or adjusted under 35 U.S.C. 154(b) by 0 days.

(21) Appl. No.: 16/063,261

(22) PCT Filed: Nov. 29, 2016

(86) PCT No.: PCT/DE2016/000423
§ 371 (c)(1),
(2) Date: Jun. 16, 2018

(87) PCT Pub. No.: WO2017/101895
PCT Pub. Date: Jun. 22, 2017

(65) Prior Publication Data
US 2019/0086258 A1    Mar. 21, 2019

(30) Foreign Application Priority Data

Dec. 16, 2015 (DE) ......................... 10 2015 016 240

(51) Int. Cl.
*G01J 1/42* (2006.01)
*G01J 1/04* (2006.01)

(52) U.S. Cl.
CPC ........... *G01J 1/4257* (2013.01); *G01J 1/0411* (2013.01); *G01J 2001/4261* (2013.01)

(58) Field of Classification Search
CPC . G01J 1/0411; G01J 1/4257; G01J 2001/4261
(Continued)

(56) References Cited

U.S. PATENT DOCUMENTS

| 6,476,908 B1 | 11/2002 | Watson |
| 9,753,221 B2 | 9/2017 | Baerenklau et al. |
| 2018/0080819 A1 | 3/2018 | Kramer et al. |

FOREIGN PATENT DOCUMENTS

| DE | 3738480 A1 | 5/1989 |
| DE | 102013013071 B3 | 10/2014 |

(Continued)

OTHER PUBLICATIONS

Jorge, Kelly C. et al., "Scattered light imaging method (SLIM) for characterization of arbitrary laser beam intensity profiles", Applied Optics, vol. 53, No. 20, Jul. 10, 2014, pp. 4555-4564.
(Continued)

*Primary Examiner* — Tri T Ton
(74) *Attorney, Agent, or Firm* — McDonnell Boehnen Hulbert & Berghoff LLP

(57) ABSTRACT

The invention relates to a measuring probe for scanning light beams (10) or laser beams. The measuring probe is suitable for scanning laser beams with very high power and for determining geometric parameters of a light beam (10) with high spatial resolution. For this purpose, a device is proposed which comprises a body (20), a probe area (30) and a detector (40). The body (20) is made of an optically transparent material and has a light beam entry surface (22), a light beam exit surface (23) and a detection light exit surface (25). The light beam entry surface (22) and the light beam exit surface (23) are for the most part smooth and polished. The body (20) includes the probe area (30) having light-deflecting structuring. The detector (40) is designed to detect at least part of the beam portion (15) deflected from the light beam (10) by the probe area (30). The body (20) and the light beam (10) are movable in two different directions of movement (51, 52) perpendicular to the direction of the axis (11) of the light beam (10) relative to each other. The probe area (30) has a shape whose two-dimen-
(Continued)

sional projection on a surface perpendicular to the axis (11) of the light beam (10) approximately the same dimensions in the two different directions of movement (51, 52) perpendicular to the axis (11) of the light beam (10).

26 Claims, 20 Drawing Sheets

(58) Field of Classification Search
USPC .................................. 356/121–123, 128–137
See application file for complete search history.

(56) References Cited

FOREIGN PATENT DOCUMENTS

| DE | 102015004163 A1 | 10/2016 |
|---|---|---|
| DE | 102015016240 B3 | 5/2017 |
| WO | 9415233 A1 | 7/1994 |
| WO | 2006052512 A1 | 5/2006 |
| WO | 2015093171 A1 | 6/2015 |

OTHER PUBLICATIONS

Stuart, BC., et al., "Laser-Induced Damage in Dielectrics with Nanosecond to Subpicosecond Pulses", Physical Review Letters, vol. 74, No. 12, Mar. 20, 1995, pp. 2248-2251.
English Translation of Abstract of DE 37 38 480 dated Jun. 14, 2018.
English Translation of Abstract of WO 2015/093171 dated Jun. 14, 2018.
English Translation of Abstract of German Patent Application No. 102015016240 dated Dec. 11, 2018.

a)

b)

c)

TRANSPARENT MEASURING PROBE FOR BEAM SCANNING

FIELD OF THE INVENTION

The invention relates to a device for scanning light beams. The invention is suitable for the determination of geometric parameters such as the intensity distribution, the beam profile or the beam diameter in the cross-section of a light beam or laser beam. The invention enables the direct scanning of laser beams with the highest brightness and power in the kilowatt and multi-kilowatt range without prior attenuation of the laser beam. The device can be used to scan several beam cross-sections in different planes and can thus also be used to determine beam parameter products, beam propagation factors or focus positions of laser beams.

Background of the Invention

The geometrical parameters of a light beam or laser beam are important parameters for the characterisation of the beam. Such parameters may be, for example, the beam diameter, the beam profile, the focus position or the beam parameter product. Beam parameters must be measured at regular intervals for quality control in many production processes in which light beams are used. Particular difficulties are to be overcome if the light beam to be measured is a laser beam with high brightness and/or power, and if the beam waist of a focused laser beam is to be measured where very high-power densities occur. On the one hand, with very high-power laser beams, the sensor or element located in the beam to obtain a sensor signal can be altered or destroyed. On the other hand, if the beam is first attenuated to avoid such problems, the high power of a beam may influence the attenuator, for example, by inducing thermal effects, whereby the parameters of the beam may be altered and, consequently, the measurement is unreliable.

Such attenuation devices are state of the art. By way of example, reference is made to DE 10 2011 117 327 A1, which discloses a comparatively simple device for precise and reproducible attenuation, which consists of several beam splitters arranged in different spatial directions. The device shown is only suitable for collimated beams. Accordingly, as shown in the disclosure, a divergent or focused beam must first be collimated with a lens. Another example of an attenuation device shows the DE 10 2012 106 779 A1, which works on a similar basic principle, but is also suitable for divergent radiation: a lens is arranged down-beam behind beam splitters. In the known devices of this type, the radiation passes through several optical elements before the radiation to be measured can be registered by a detector. The correct functioning of the attenuation devices without influencing the beam is usually only guaranteed so long as the surfaces of the optical elements are not contaminated or dust-laden. A fundamental uncertainty as to whether or not the beam has been changed by the optical elements due to thermal interaction in its geometrical parameters is therefore difficult to avoid. To eliminate such uncertainties, it is necessary to take a sample or scan directly in the unchanged and non-attenuated beam.

For scanning the intensity distribution in a cross-sectional plane of the light beam, numerous methods are known in the current state of the art. One basic option for the measurement is to direct the beam onto a spatially resolving sensor, for example onto a CCD camera, and in this way to determine the intensity distribution in the cross-section of the beam. Such a direct measurement with a spatially resolving sensor is inevitably unsuitable for higher power beams. It is therefore common for higher power beams to scan the intensity distribution in a raster movement, e.g. line-by-line scanning with a device that takes a sample from a small segment of the beam and leads [directs] this sample radiation onto a detector.

A device of the aforementioned type, for example, is disclosed in DE 199 09 595 A1. There, the beam is scanned with a pinhole or with a small pinhole aperture with the special feature that behind the pinhole a scattering body is arranged, whereby the measurement signal obtained is less dependent on the direction of incidence of the radiation to be measured. Another device of this kind is shown in WO 2009/000500 A1. Again, a partial beam is coupled out of the beam by means of an aperture or a hollow needle-like scanning head which scans the beam cross-section. The partial beam is directed by means of a lens on a spatially resolving detector for generating wave-front specific measurement data.

It is not always necessary to couple the scanning head with a moving device. If a beam is to be measured which is generated by a scanner optics, then the beam deflection device of the scanner optics can be used to guide the beam in a raster movement over the scanning head. Such devices and methods are disclosed, for example, in DE 10 2005 038 587 A1 and DE 10 2011 006 553 A1.

In the known devices for scanning a beam, it is necessary to restrict the beam in some way spatially, in order to obtain a partial beam of a small segment of the beam cross-section. These restrictions may be pinholes, apertures, hollow needles, deflection mirrors or their edges or holders, or other devices. In doing so, radiation inevitably falls temporarily on these limitations, which can be destroyed at very high-power densities, such as may occur in the focus of a high-brightness beam, even if the beam falls on the boundary only for a very short period of time during the scan. The known devices are therefore not suitable for the measurement of beam cross-sections in the region of the waist or in the region of the focus position of laser beams with very high power.

In WO 98/50196 an apparatus is disclosed for detecting and calculating focus position, profile and power distribution of a focused beam. For this, the beam is scanned with a light affecting body. In the embodiment shown, the light affecting body is an optical fibre arranged transversely to the beam, which deflects parts of the laser beam onto a light sensor. In this process captures the fibre inevitably the entire beam cross-section in one direction, so that the measurement signal is a signal integrated in one dimension and thus no spatially resolved signals can be generated for this direction. The light affecting body is reflective in other disclosed embodiments, e.g. containing silver or designed absorbingly. Thus, the device known from WO 98/50196 is on the one hand not suitable for laser radiation of the highest power and brightness, and on the other hand, the device described is not suitable for achieving high spatial resolution, since the disclosure does not provide information about a well-defined interaction geometry on or in the light affecting bodies.

The devices and methods known from the state of the art have accordingly considerable disadvantages with regard to their usability at very high laser power or power density, and/or with regard to the achievable spatial resolution.

BRIEF DESCRIPTION OF THE INVENTION

The invention is thus based on the objective to provide a measuring probe for scanning light beams, which is suitable for the determination of geometric parameters of laser beams of high power or power density, and which makes the determination of geometric parameters in high spatial resolution possible.

To achieve the objective, an apparatus for scanning a light beam is proposed, which comprises a body, a probe area and a detector. The body is made from an optically transparent material and has a light beam entry surface, a light beam exit surface, and a detection light exit surface. The light beam entry surface and the light beam exit surface are for the most part smooth and polished. The body contains the probe area, which has light-deflecting structuring. The detector is designed to detect at least part of the beam portion deflected from the light beam by the probe area. The body and the light beam are movable relative to each other in two different directions of movement perpendicular to the direction of the axis of the light beam. The probe area has a shape whose two-dimensional projection onto a surface perpendicular to the axis of the light beam (or projection in the direction of the axis of the light beam) has approximately similar dimensions in the two different directions of movement perpendicular to the axis of the light beam.

An embodiment of the invention is intended in which the probe area has a shape whose two-dimensional projection is radially symmetrical on a surface perpendicular to the axis of the light beam (or projection in the direction of the axis of the light beam).

The body may be rod-shaped in one embodiment of the invention.

An embodiment of the invention is also intended in which the body is disc shaped.

The light-deflecting structuring in the probe area can be formed by varying the refractive index and/or the density of a material in the probe area.

The light-deflecting structuring in the probe area can also be formed by [through] a roughness of a surface.

It is also intended that the light-deflecting structuring in the probe area may be formed by one or more voids or cracks in the material of the probe area.

It is further intended that the light-deflecting structuring may be formed in the probe area by doping a material in the probe area.

The light-deflecting structuring in the probe area can be produced by means of a focused short-pulse laser.

An embodiment of the invention is intended in which the probe area is spherical.

In a possible embodiment of the invention, the light-deflecting structuring in the probe area is formed by a plurality of structural details whose spatial density distribution within the probe area is radially symmetric or rotationally symmetrical.

The optically transparent material of the body may have an absorption of less than 100 ppm/cm in the range of the wavelength of the light beam to be scanned.

In one possible embodiment of the invention, the body includes a detection light deflection area, which deflects at least a portion of the from the probe area deflected beam portion to the direction of the detector.

The detection light deflection area can be formed by light-deflecting structuring.

The detection light deflection area can also be formed by one or more recesses in the body.

The detection light deflection area can furthermore be formed by an inclined surface of the body.

An embodiment of the device is intended in which the body is stationary, and the light beam is movable relative to the body.

An embodiment of the device is intended in which the body is movable relative to the light beam.

In one possible embodiment of the invention, a direction of movement for scanning the light beam is generated by a rotational movement of the body about an axis of rotation which has a distance from the axis of the light beam.

A different direction of movement for scanning the light beam can be generated by changing the distance of the axis of rotation to the axis of the light beam.

In a further possible embodiment of the invention, a direction of movement for scanning the light beam is generated by an oscillation motion of the body.

An embodiment of the device is intended in which the body is additionally movable in one direction along the axis of the light beam.

In one possible embodiment of the invention, a light collection device is arranged between the detection light exit surface of the body and the detector. The light collection device comprises at least one of the following elements: a lens, a gradient index lens, a concave mirror, a light conductor, or a waveguide.

An embodiment of the apparatus is intended in which the body includes further probe areas arranged at different positions for producing several parallel or concentric scanning tracks.

An embodiment of the invention is intended in which the body includes, in addition to the probe area, an elongated area having light-deflecting structuring. The elongated area is basically designed one-dimensionally, has a distance to the probe area in the direction of one direction of movement and is oriented perpendicular to the axis of the light beam.

The apparatus according to the invention can be used for determining at least one of the following parameters of the light beam: Beam diameter, beam profile, intensity distribution in the cross-section of the light beam, divergence angle, beam parameter product, propagation factor, focus position.

BRIEF DESCRIPTION OF THE FIGURES

The invention is illustrated in more detail with reference to the following figures, without being limited to the embodiments shown. It shows.

DETAILED DESCRIPTION OF THE FIGURES

Figure 1:
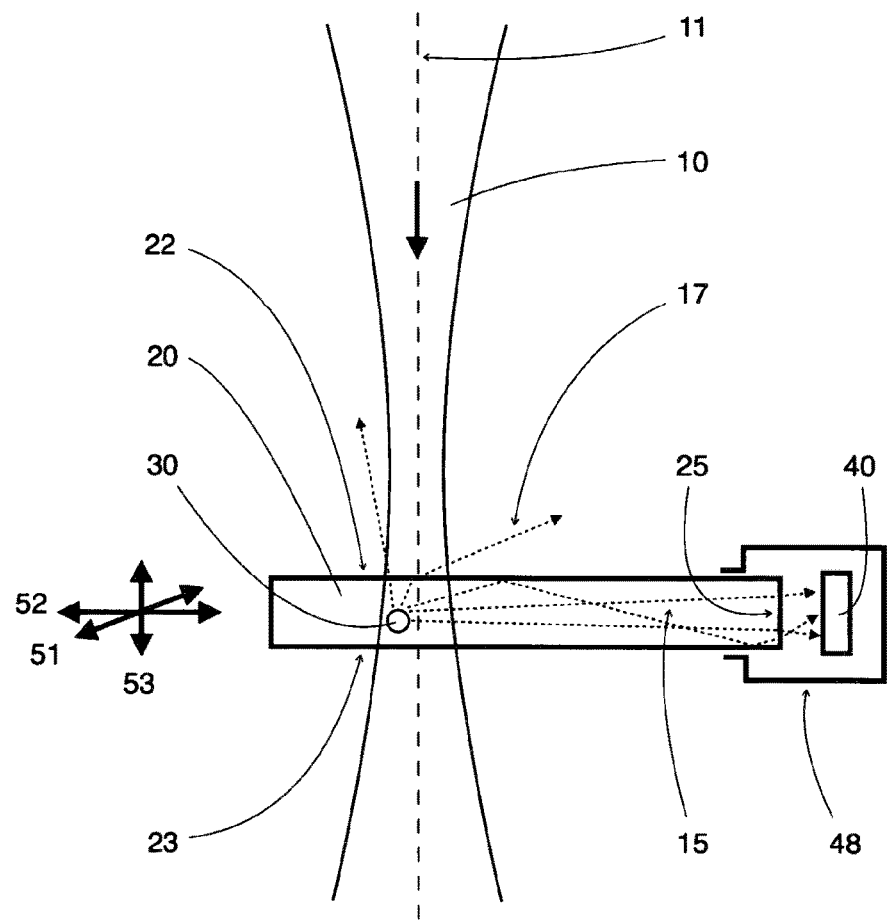
FIG. 1: A schematic cross-sectional representation of the device according to the invention for scanning a light beam.

FIG. 1 shows schematically a sectional representation of the invention. A laser beam or light beam 10 having an axis 11 strikes the light beam entry surface 22 of a body 20 made of a transparent optical material. The light beam 10 propagates through the body 20 and exits the body 20 via the light beam exit surface 23. The body 20 includes a probe area 30 having light-deflecting structuring. On the light-deflecting structuring of the probe area 30, a portion of the light beam 10 is deflected in other directions when the light beam 10 strikes the probe area 30. A portion of the light 17 may be deflected in directions leaving the body 20 without encountering the detector 40. Another portion of the light 15 is deflected in a direction in which the deflected light 15 is guided within the body 20 to the detection light exit surface 25, at which the deflected light 15 leaves the body 20. At least part of the deflected light 15 is detected by the detector 40. To avoid unwanted light components on the detector 40, the detection light exit surface 25 and the detector 40 may be jointly enclosed by a cover 48. The body 20 and the light beam 10 are movable in several spatial directions 51, 52, 53 relative to each other.

Figure 2:
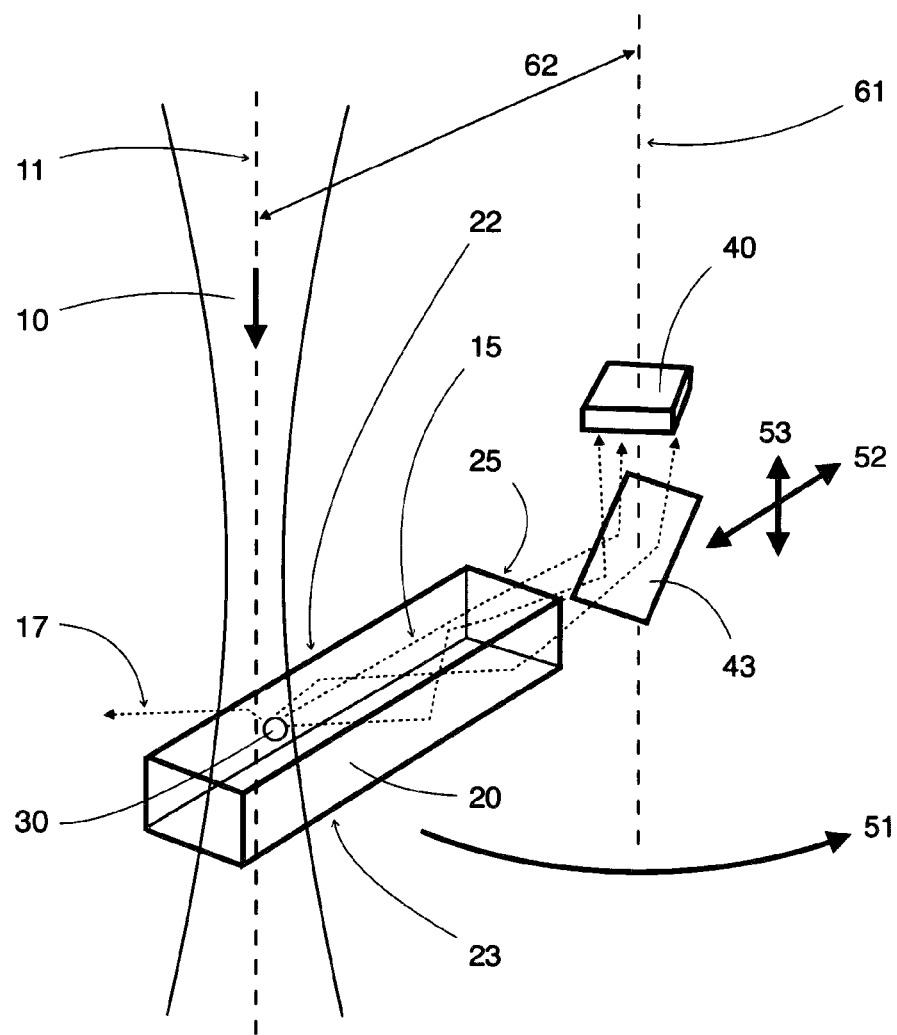
FIG. 2: A schematic representation of a possible embodiment of the invention with a rectangular rod as a body, with a deflection mirror for the detection light and with a axis of rotation for generating a relative movement.

In FIG. 2, an exemplary embodiment of the invention is shown schematically, in which the body 20 has an elongated rod-shaped configuration with a rectangular cross-section. To generate a relative movement 51 between the light beam 10 and the body 20, the body 20 is pivoted on an axis of rotation 61, which is preferably arranged parallel to the axis 11 of the light beam 10. To generate a further relative movement 52 between the light beam 10 and the body 20, the body 20 and the axis of rotation 61 are coupled to a motion device so that the distance 62, between the axis 11 of the light beam 10 and the axis of rotation 61, is variable. On the axis of rotation 61, a deflection mirror 43 is arranged, which deflects the deflected light 15 propagating via the detection light exit surface 25 in the direction of the detector 40. The deflection mirror 43 is preferably rigidly coupled to the body 20, so also rotates about the axis of rotation 61. However, the detector 40, which is also arranged on the axis of rotation 61, need not be rigidly coupled to the body 20 and the deflection mirror 43, but is preferably coupled with the motion device, which generates the relative movement 52, so that the position of the detector 40 remains on the axis of rotation 61.

Figure 3:
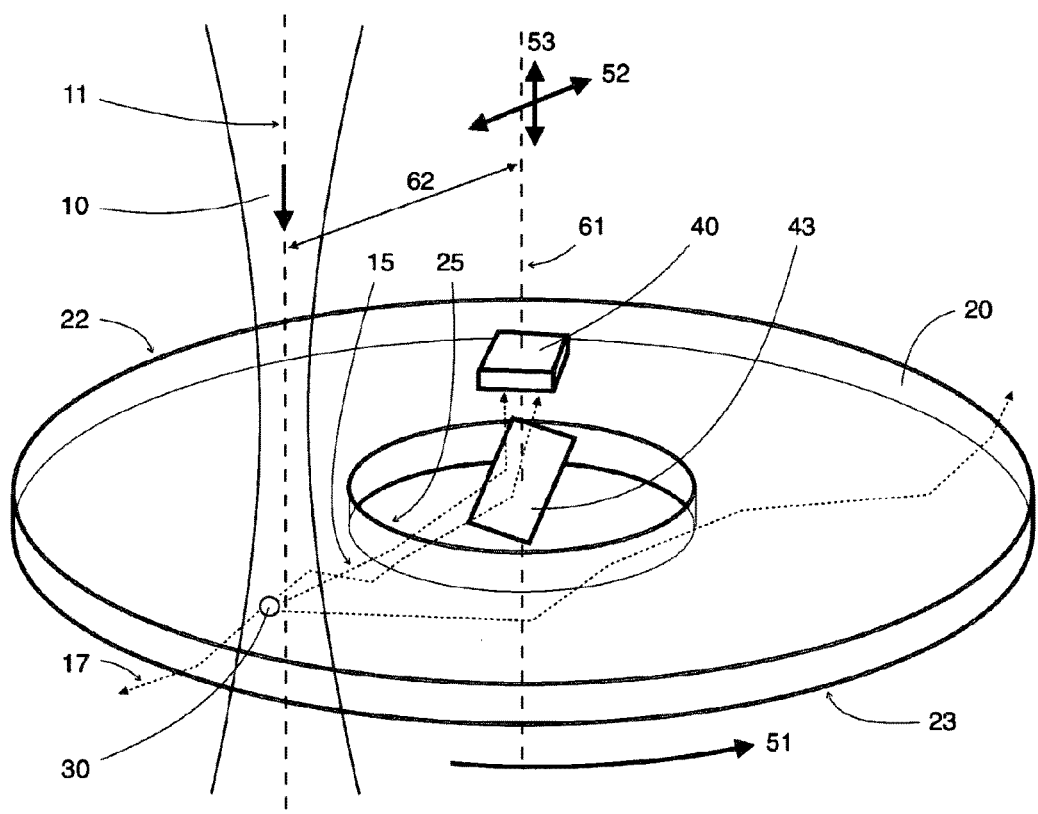
FIG. 3: A schematic representation of an exemplary embodiment of the invention with a disc as a body.

FIG. 3 shows an exemplary embodiment of the invention, in which the body 20 is not designed rod-shaped, but has a disc-shaped build and has a recess in the middle. The axis of rotation preferably runs through the middle or along the axis of symmetry of the disc-shaped body 20. The other arrangement[s] may be completed in accordance with FIG. 2.

Figure 4:
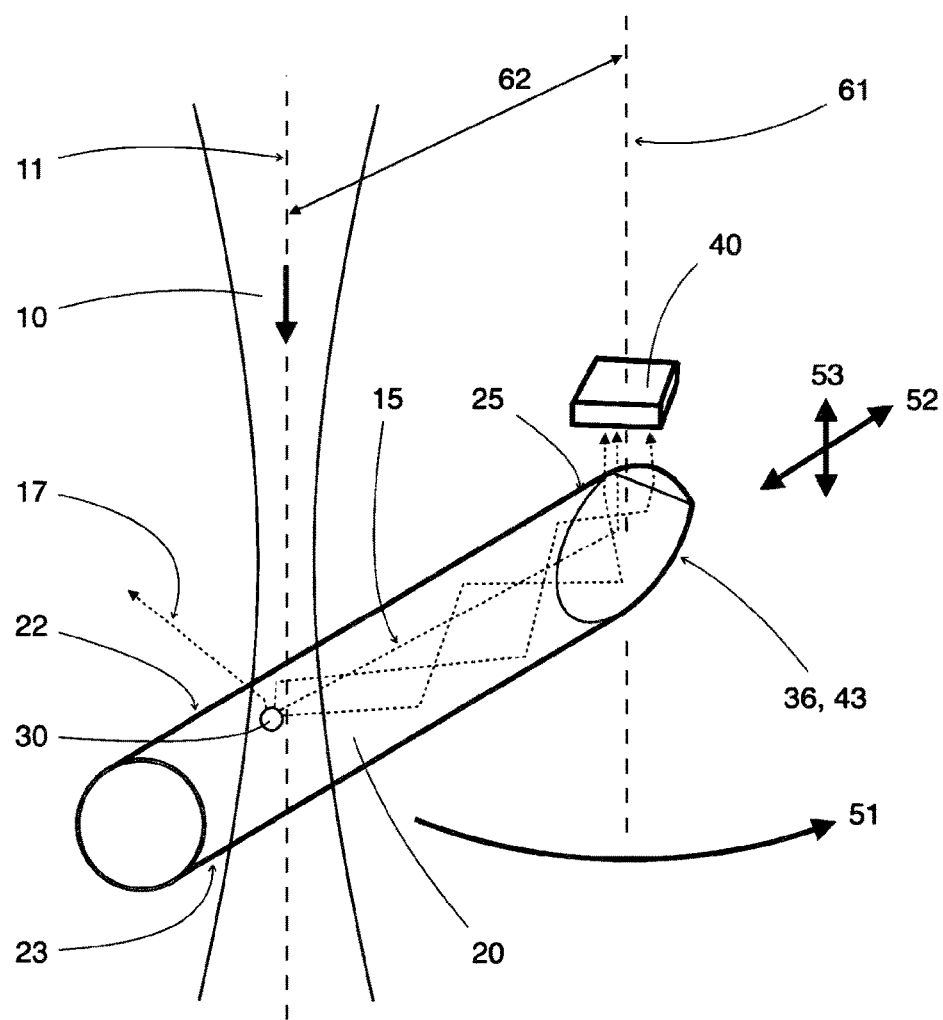
FIG. 4: A schematic representation of another exemplary embodiment of the invention with a cylindrical body, with an inclined surface of the body for deflecting the detection light and with an axis of rotation for generating a relative movement.

In FIG. 4 another exemplary embodiment of the invention similar to the embodiment shown in FIG. 2 is shown. In contrast to FIG. 2, the body 20 is formed as a cylindrical rod. Further, in this example, the body 20 includes a detection light deflection area 36. As shown in FIG. 4, the detection light deflection area 36 may be configured as an inclined surface of the body 20, thus acting as a deflection mirror 43.

Figure 5:
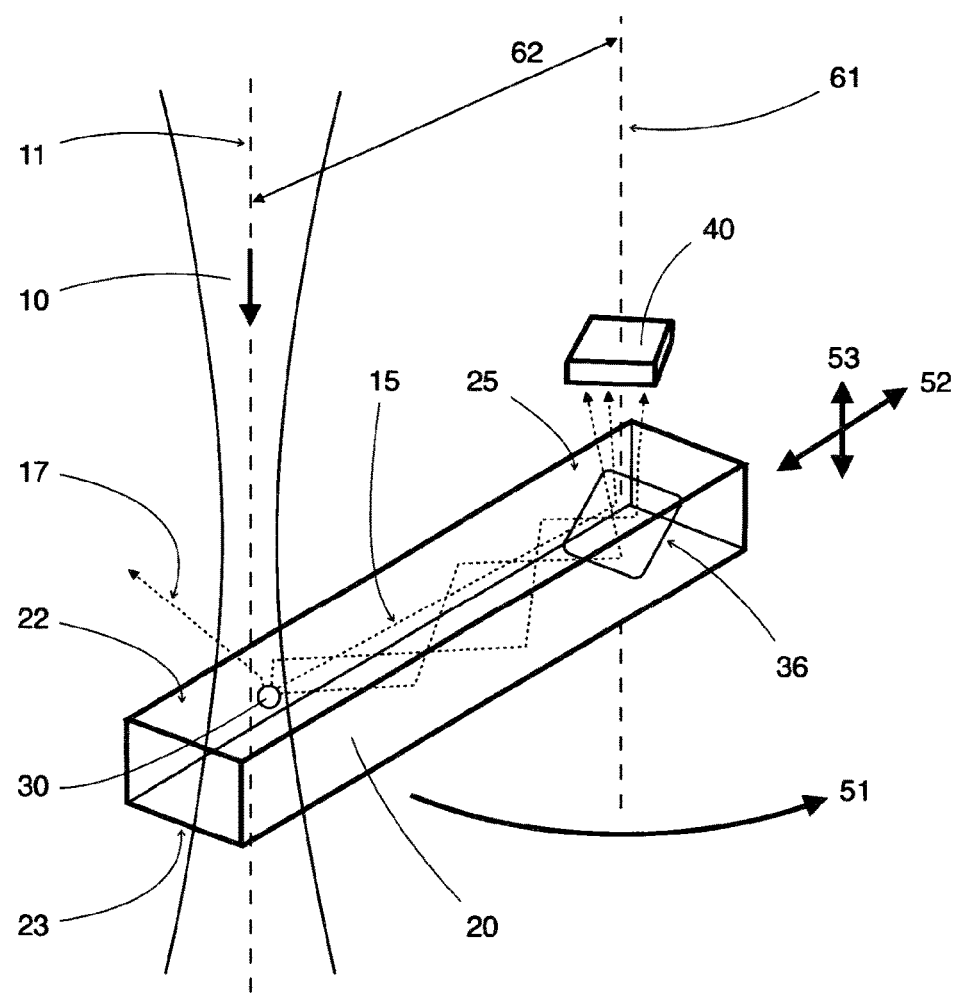
FIG. 5: A schematic representation of another exemplary embodiment of the invention with a detection light deflection area within a rod-shaped body.

In the exemplary embodiment of the invention shown in FIG. 5, the body 20 also has a detection light deflection area 36. In contrast to FIG. 4, the detection light deflection area 36 here is an area inside the rod-shaped body 20, which may be formed, for example, by light-deflecting structuring.

Figure 6:
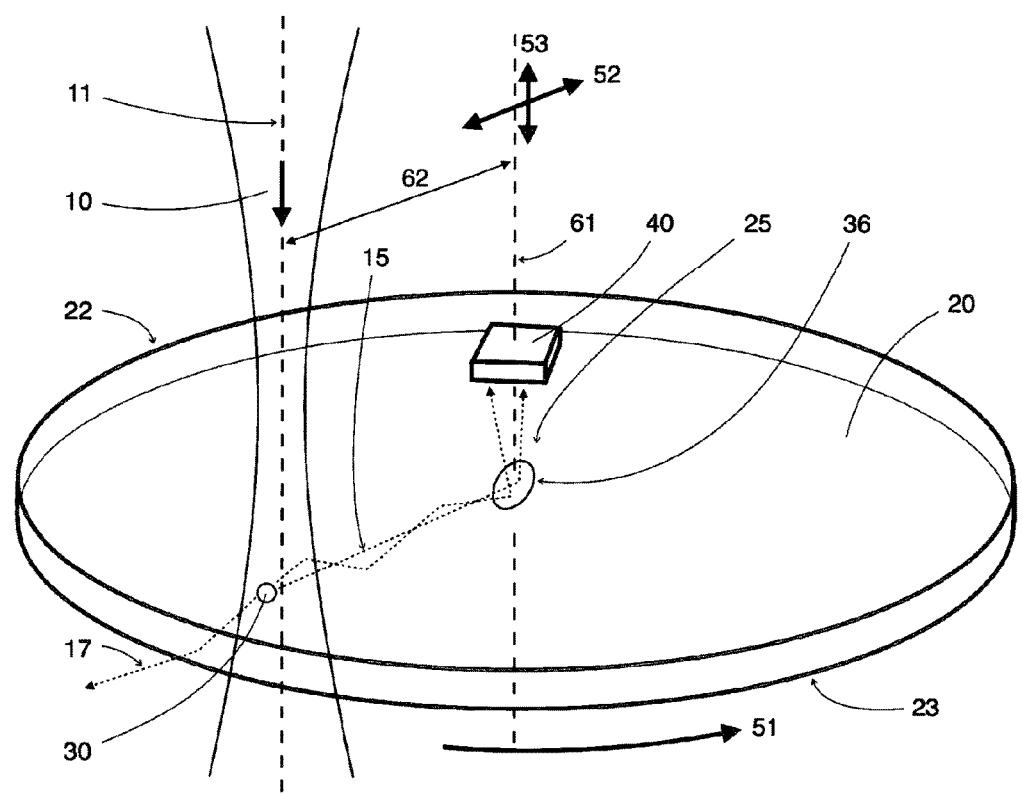
FIG. 6: A schematic representation of another exemplary embodiment of the invention with a disc shaped body, with a detection light deflection area within the body and with an axis of rotation for generating a relative movement.

FIG. 6 shows an exemplary embodiment of the invention in which a detection light deflection area 36 is arranged in a disc-shaped body 20. The detection light deflection area 36 is preferably arranged in the middle of the disc-shaped body and deflects a part of the light deflected by the probe area 30 in the direction of the detector 40. The detector 40 may be arranged in the axis of rotation 61 around which the disc-shaped body 20 rotates to produce the relative movement 51 relative to the light beam 10. The detector 40 itself does not have to rotate together with the body 20 about the axis of rotation 61.

Figure 7:
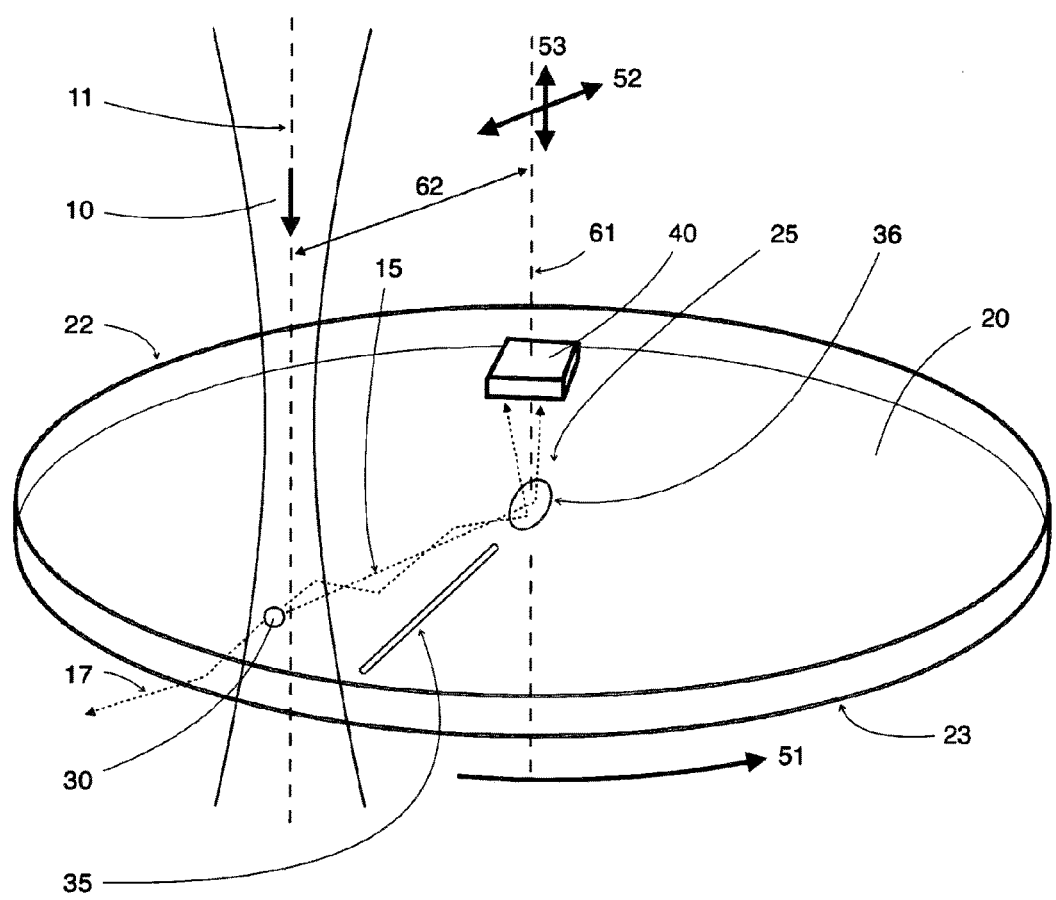
FIG. 7: A schematic representation of another exemplary embodiment of the invention, in which the body additionally has an elongated area with light-deflecting structuring.

In the exemplary embodiment of the invention illustrated in FIG. 7, the body 20 additionally includes an elongated area 35 with light-scattering structuring. The elongated area 35 is arranged at a distance from the probe area 30 in the direction of movement 51. For each scanning motion, an additional signal is thereby generated on the detector 40 which can be used to synchronise the signals from the individual scanning motions.

Figure 8:
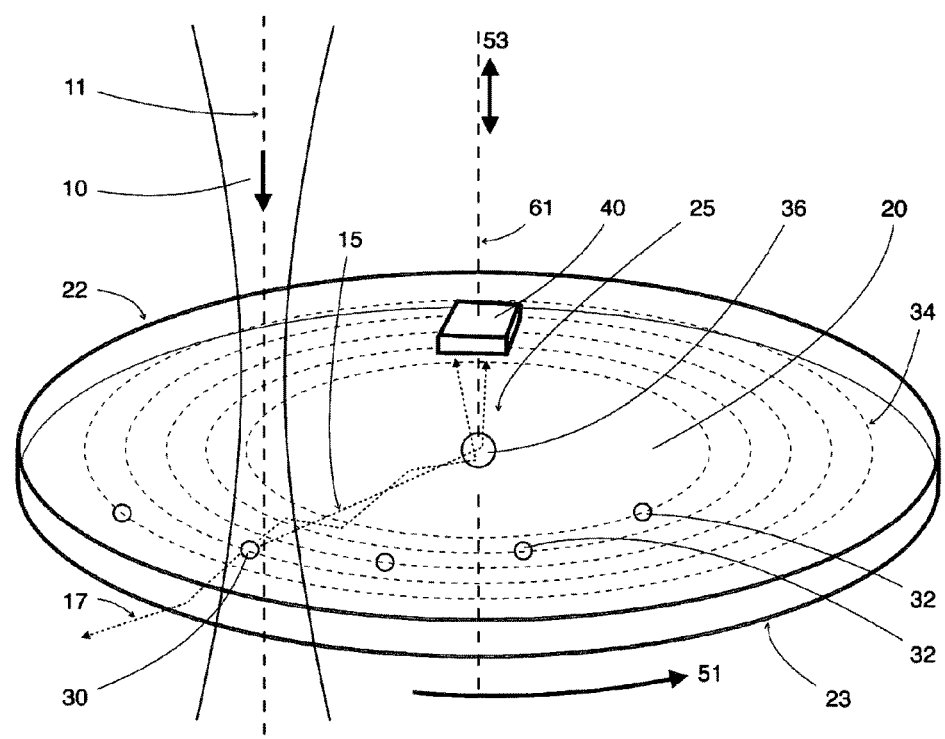
FIG. 8: A schematic representation of a further exemplary embodiment of the invention having a disc shaped body, with a detection light deflection area within the body and with additional probe areas inside the body for producing several concentric scanning tracks with a single revolution of the body.

FIG. 8 shows an exemplary embodiment similar to FIG. 6. In this example, in addition to the probe area 30, further probe areas 32 are arranged in different azimuthal positions in the disc-shaped body 20. The probe areas 32 can have different distances to the axis of rotation 61, so that a single revolution of the body 20 produces several concentric scanning tracks 34. The scanning time for complete capture of a cross-section of the light beam 10 can thereby be significantly reduced.

Figure 9:
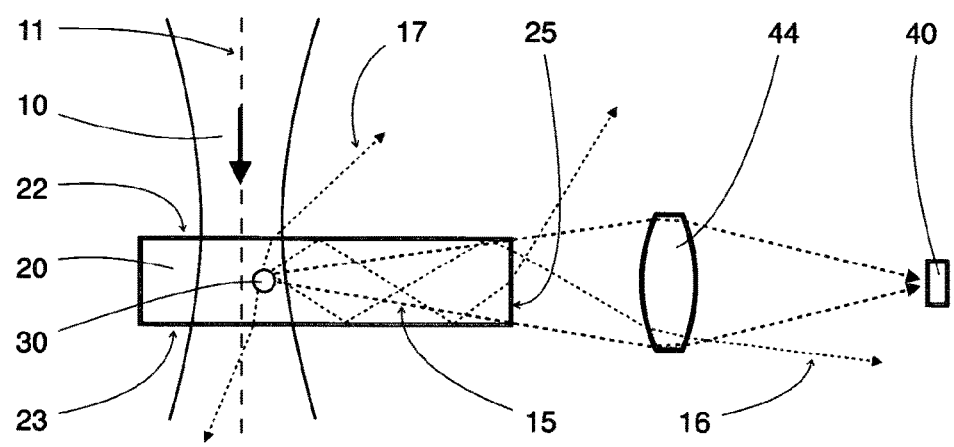
FIG. 9: A schematic cross-sectional representation of a further exemplary embodiment of the invention with a lens which images the probe area onto the detector.

In FIG. 9 another possible aspect of the invention is shown. Between the detection light exit surface 25 and the detector 40, a light collection device 44 is arranged in this example. The light collection device 44 may be a lens which images the probe area 30 onto the detector 40 in the exemplary embodiment shown in FIG. 9. On the one hand the proportion of light, which is detected by the detector 40, can be increased with the light collection device 44, on the other hand the exact imaging of the probe area 30 to the detector 40 causes a selection of the detected light portion. By means of this detection light selection unwanted scattered light can be suppressed. However, there may also be as detection light desired beam portions 16 which, indeed, are also guided by total reflection within the body 20 to the detection light exit surface 25, but due to the beam selection by the imaging can not reach the detector 40.

Figure 10:
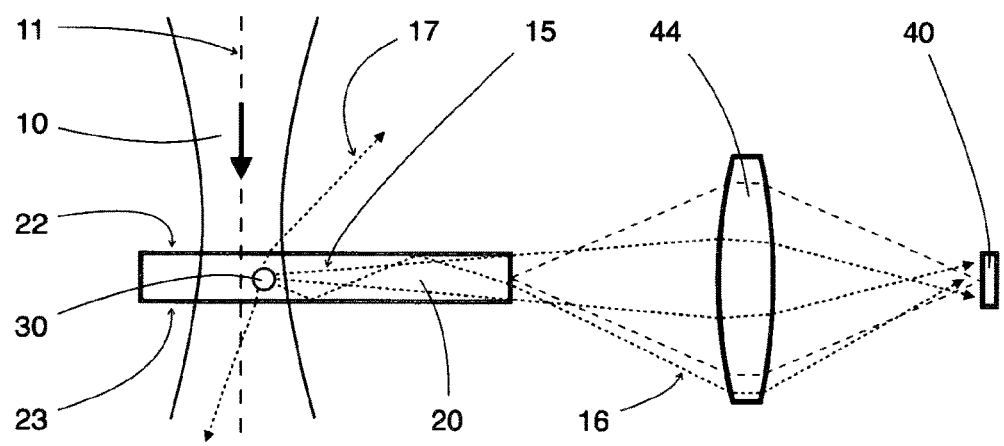
FIG. 10: A schematic cross-sectional representation of another exemplary embodiment of the invention with a lens which images the detection light exit surface on the detector.

FIG. 10 shows a similar aspect of the invention as FIG. 9. In the exemplary embodiment shown here, the probe area 30 is not imaged by the light collection device 44 or the lens, but the detection light exit surface 25 is imaged onto the detector 40. As a result, a significantly greater portion of deflected radiation 15 can be detected by the detector 40. Radiation components 16, which are guided by total reflection within the body 20 to the detection light exit surface 25, can thus be imaged onto the detector 40.

Figure 11:
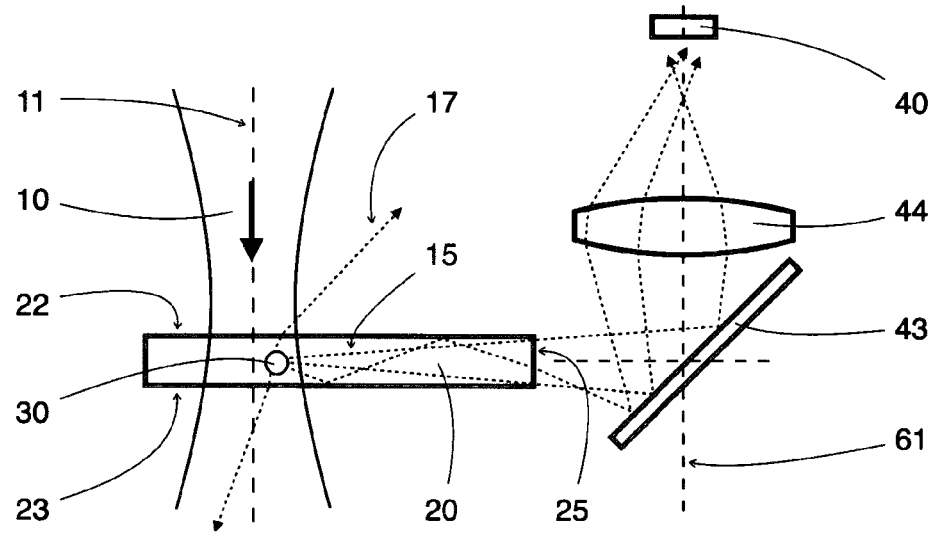
FIG. 11: A schematic cross-sectional representation of another exemplary embodiment of the invention with a deflection mirror for the detection light and with a lens as a light collection device.

Also in the exemplary embodiment shown in FIG. 11, the detection light exit surface 25 is imaged onto the detector 40 by means of a lens as light collection device 44. In addition, the detection light 15 is deflected by means of a deflection mirror 43. An arrangement with deflection of the detection light is favourable if the relative movement 51 is generated by rotation of the body 20 about an axis of rotation 61. Preferably, deflection mirror 43 and light collection device 44 are arranged on the axis of rotation 61. For that it is not necessary that the light collection device 44 and the detector 40 are coupled to the rotational movement.

Figure 12:
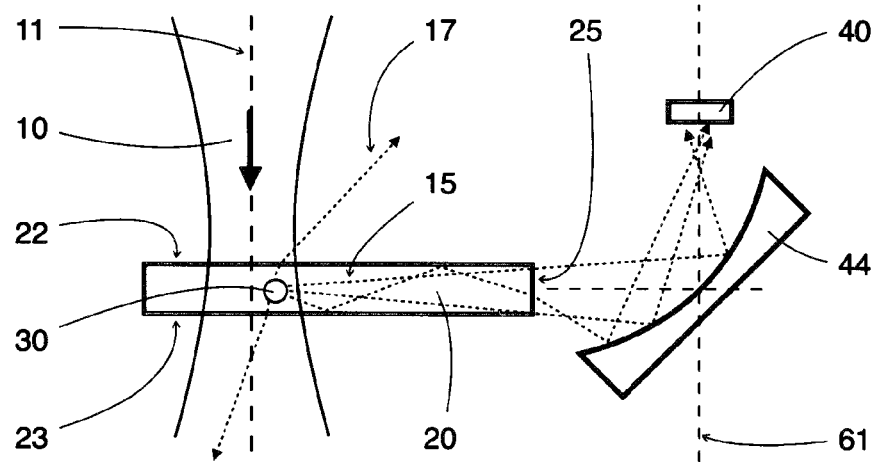
FIG. 12: A schematic cross-sectional representation of another exemplary embodiment of the invention with a concave mirror as a light collection device.

The light collection device 44 can also be designed as a concave mirror, as shown schematically in FIG. 12. Deflection mirror and light collection device are combined in this way in one optical element.

Figure 13:
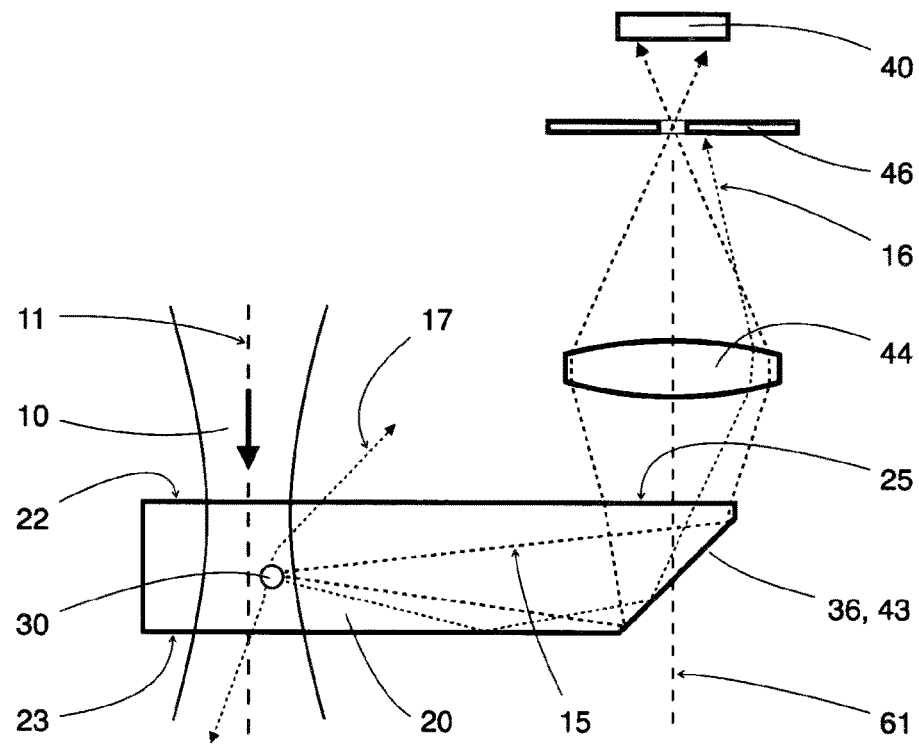
FIG. 13: A schematic cross-sectional representation of another exemplary embodiment of the invention with an inclined surface of the body for deflecting the detection light, with an aperture means and with a lens which images the probe area onto the opening of the aperture.

In the possible aspect of the invention shown in FIG. 13, the body 20 is provided with a detection light deflection area 36. The detection light deflection area 36 may be an area with light-deflecting structuring, a cavity or recess in the body 20, or as shown in FIG. 13 an inclined surface of the body 20, which thus acts as a deflection mirror 43. FIG. 13 shows yet another possible aspect of the invention. An aperture means 46 may be placed between the detection light exit surface 25 and the detector 40. With the aperture means 46 it can be achieved that as far as possible only beam portions 15 deflected by the probe area 30 are detected by the detector 40. For this purpose, in the exemplary embodiment shown in FIG. 13, the light collection device 44 or the lens images the probe area 30 on the aperture means 46. Only the detection light which passes through the opening of the aperture means 46 can be detected by the detector 40.

Figure 14:
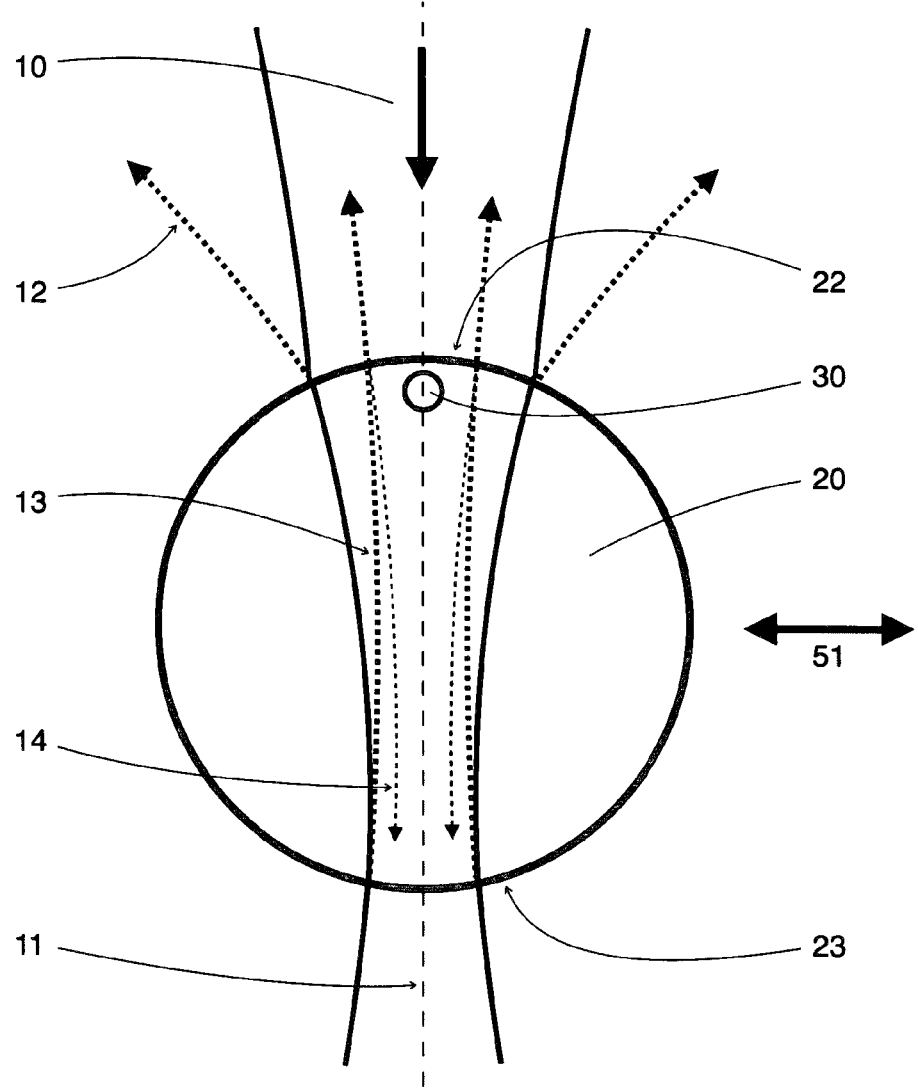
FIG. 14: A partial view of the invention in a plan view on the body, which is formed in this exemplary embodiment as a cylindrical rod, with a probe area near the light beam entry surface and with an additional representation of the light beams reflected on the light beam entry surface and on the light beam exit surface.
Figure 15:
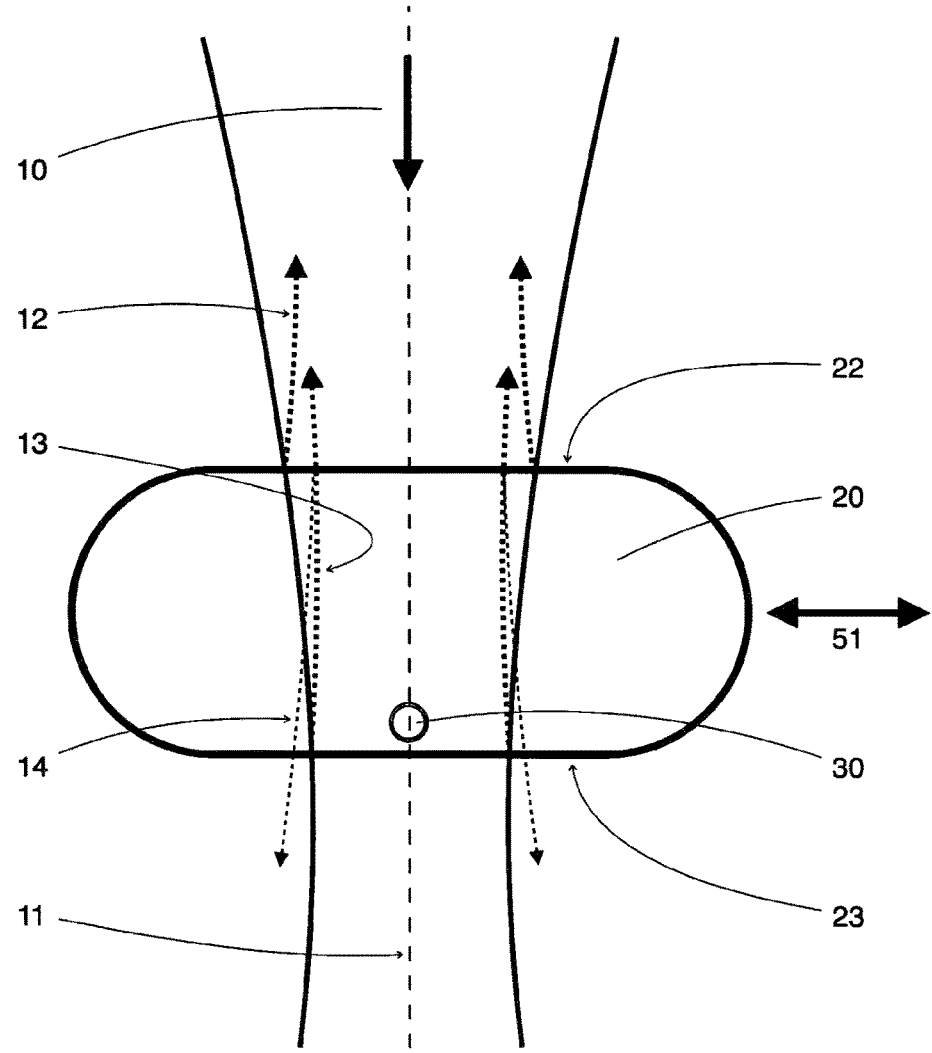
FIG. 15: A partial view of the invention in a plan view on the body, which is formed in this exemplary embodiment as a rod with semi-cylindrical side surfaces, with a probe area near the light beam exit surface and with an additional representation of the light beams reflected on the light beam entry surface and on the light beam exit surface.

The aspects of the invention illustrated in FIGS. 14 and 15 relate to the positioning of the probe area 30 within the body 20. The body 20 exemplified in FIG. 14 has a cylindrical shape with a circular cross-section, so that the light beam entry surface 22 and the light beam exit surface 23 are cylindrically curved. Due to the refraction at the light beam entry surface 22 the beam parameters of the light beam 10 change. In order for the changes to have the least possible influence on the scanning, it is favourable for a curved light beam entry surface 22 that the probe area 30 is positioned as close as possible to the light beam entry surface 22. If the entry and exit surfaces 22 and 23 are not anti-reflective, then the light beam is not only refracted at these surfaces, but also reflected to a small extent (light beams 12, 13, 14). In the case of curved entry and exit surfaces 22 and 23, the light beam component 13 reflected at the light beam exit surface 23 can be partially focused on the probe area 30 and therefore cause signal distortions in the detection light.

The body 20 shown by way of example in FIG. 15 is a cuboid bar with semi-cylindrical side surfaces, the cross-section shown therefore has an elongated circular shape. The light beam entry surface 22 and the light beam exit surface 23 are planar in the effective range in this exemplary embodiment, so that the refraction of the light beam 10 at the light beam entry surface 22 has no influence on the beam parameters. In such a case, it is possible to position the probe area 30 close to the light beam exit surface 23. Although a partial reflection 13 of the light beam 10 at the light beam exit surface 23 may then lead to an increased signal in the detection light, however, the increased signal portion is a practically constant factor and therefore has no influence on the determination of the geometric parameters from the detected Signal. Although the light 14 successively reflected at the exit surface 23 and at the entry surface 22 could in principle lead to more pronounced signal distortions, it is already sufficiently attenuated by the two-fold reflection compared to the useful signal, the detection light deflected from the light beam 10.

Figure 16:
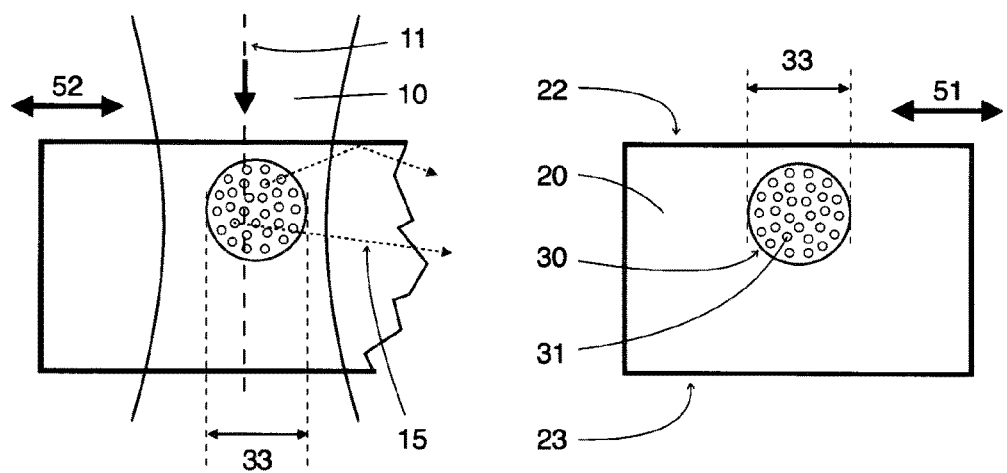
FIG. 16: A schematic representation of the probe area in a possible embodiment of the invention, in which the probe area is formed spherically, and the entire probe area has light-deflecting structuring.

FIGS. 16, 17, 18 and 19 show possible aspects of the invention which relate to the arrangement of the probe area 30. FIG. 16 shows two cross-sectional partial views of the body 20 in two different spatial directions perpendicular to the possible directions of movement 51 and 52. The probe area 30 is spherical in this exemplary embodiment. The projection of the probe area 30 in the direction of the axis 11 of the light beam 10 is thus circular and radially symmetrical with a diameter 33. The light-deflecting structuring of the probe area 30 in this example comprises a plurality of structural details 31. Details 31 are distributed evenly within the probe area 30.

Figure 17:
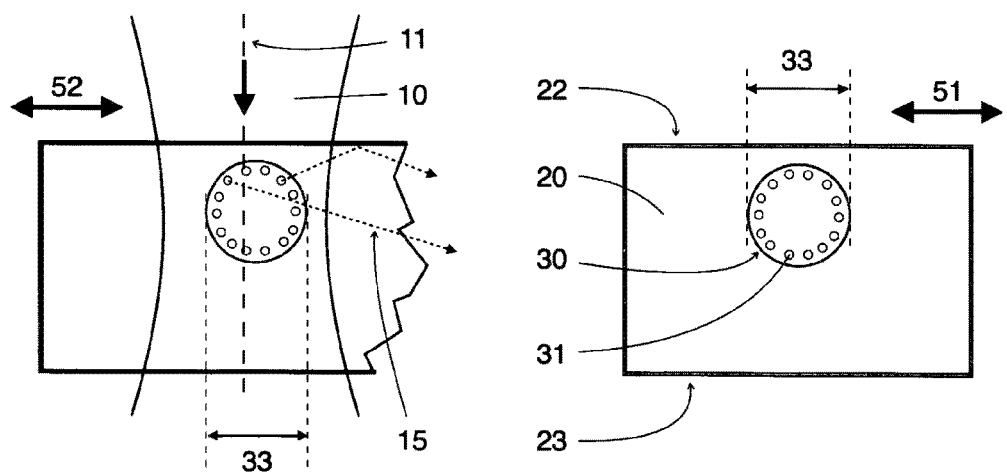
FIG. 17: A schematic representation of the probe area in another embodiment of the invention, in which the probe area is formed spherically and only an outer spherical shell area of the probe area has light-deflecting structuring.

FIG. 17 likewise shows two partial cross-sectional views of the body 20 with a spherical probe area 30 in two different spatial directions perpendicular to the possible directions of movement 51 and 52. In the exemplary embodiment of FIG. 17, the probe area 30 has light-deflecting structuring only in the area of its outer spherical shell. The light-deflecting structuring of the probe area 30 is in turn formed by a plurality of structural details 31, which are uniformly distributed within the outer spherical shell of the probe area 30.

Figure 18:
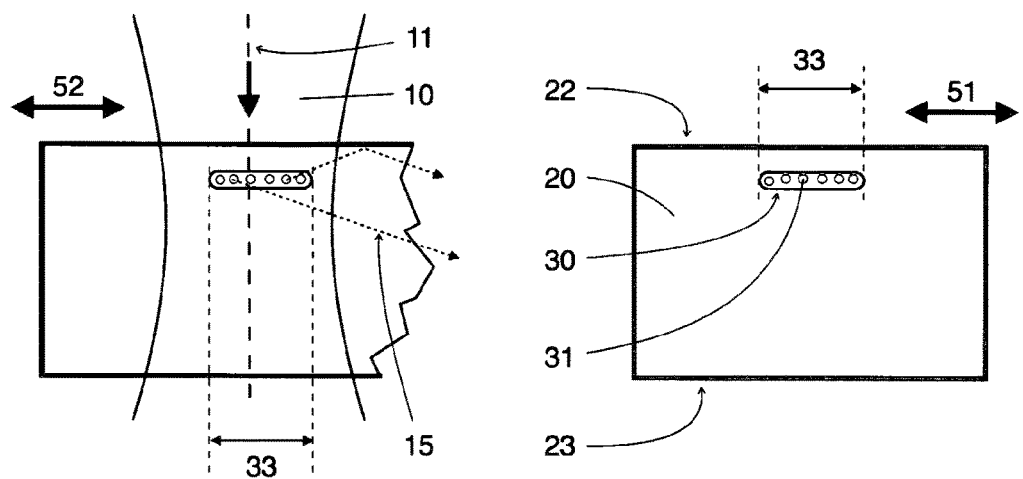
FIG. 18: A schematic representation of the probe area in another embodiment of the invention, in which the probe area is formed circular disc shaped.

FIG. 18 shows an exemplary embodiment of the body 20 with a disc-shaped probe area 30. The probe area 30 has the shape of a circular disc, which is arranged perpendicular to the axis 11 of the light beam 10 in the body 20. The projection of the probe area 30 in the direction of the axis 11 of the light beam 10 is therefore also circular and radially symmetric with a diameter 33. The light-deflecting structuring of the probe area 30 may be formed by a plurality of structural details 31 which are inside the circular disc of the probe area 30 and preferably evenly distributed.

Figure 19:
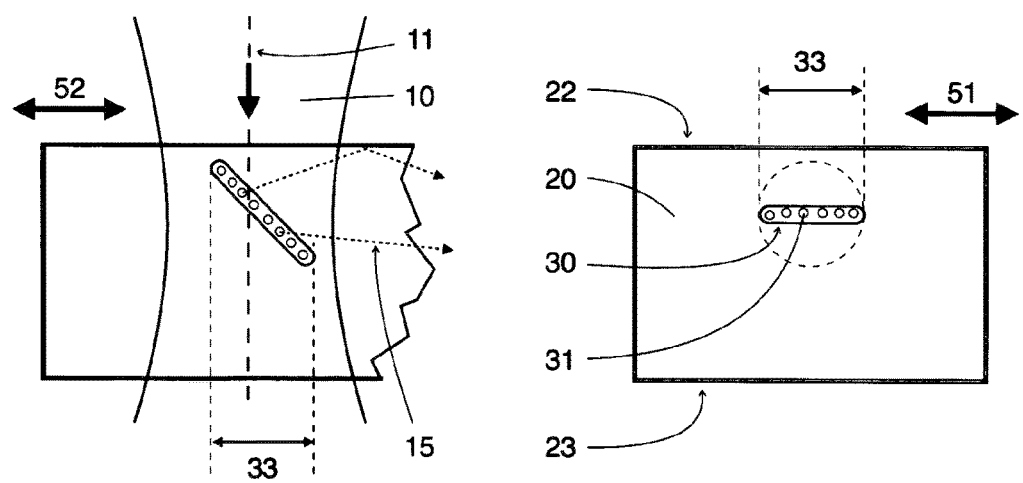
FIG. 19: A schematic representation of the probe area in a further embodiment of the invention, in which the probe area is formed elliptically and is arranged inclined to the axis of the light beam in the body, so that the projection of the probe area in the direction of the axis of the light beam represents a radially symmetric circular disc.

FIG. 19 shows another exemplary embodiment of the body 20 with a disc-shaped probe area 30 in two partial cross-sectional views of the body 20 in two different spatial directions perpendicular to the possible directions of movement 51 and 52. The probe area 30 has in this embodiment the shape of an elliptical disc, which is arranged at an angle to the axis 11 of the light beam 10 in the body 20. The angle to the axis 11 and the ellipticity of the disc of the probe area 30 are designed such that the projection of the probe area 30 in the direction of the axis 11 of the light beam 10 is circular and radially symmetrical with a diameter 33.

Figure 20:
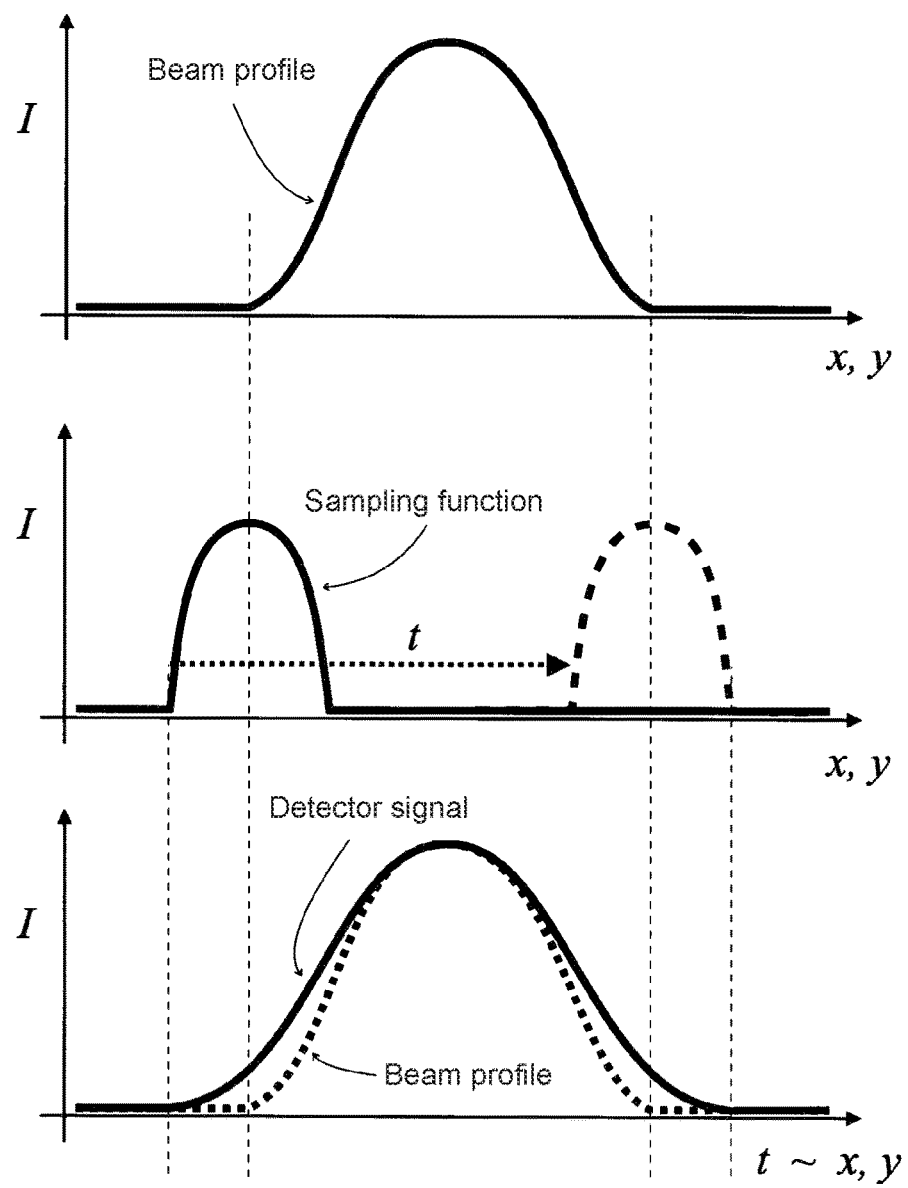
FIG. 20: A schematic representation of a beam profile in the cross-section of a light beam (top), a sampling function (centre), and a detector signal, which results from convolution of the beam profile with the sampling function (bottom).

The relationship between the beam profile along a scanning track in the cross-section of a light beam 10 and the signal at the detector 40 is shown schematically in FIG. 20. The probe area 30 has a finite extent and thus defines the width of the sampling function (FIG. 20 centre). The beam profile (FIG. 20 top and dashed in FIG. 20 bottom) is scanned with the probe area 30. In this process, the sampling function is shifted quasi [so to say] over the beam profile as a function of the time t. Mathematically, this process is represented by convolution of the beam profile with the sampling function, the result being the detector signal (FIG. 20 bottom). The detector signal is therefore widened with respect to the beam profile.

Figure 21:
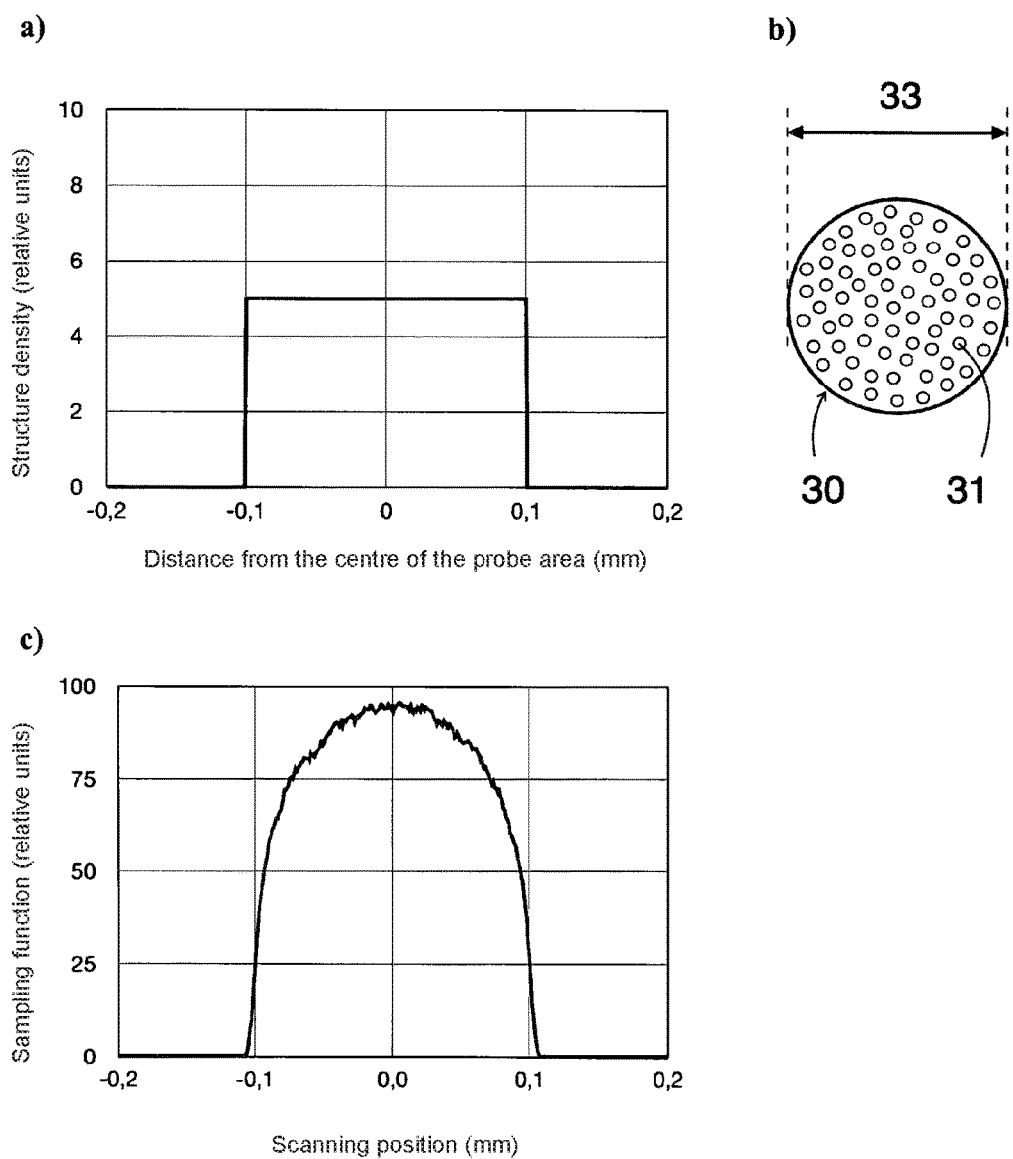
FIG. 21 A schematic cross-sectional representation of a spherical probe area with uniform distribution of structural details within the probe area (b), a schematic representation of the distribution density of the structural details (a), and a simulation of the resulting sampling function for a probe area with this structuring (c).

FIG. 21 shows schematically a spherical probe area 30, in which the light-deflecting structuring is formed by a plurality of structural details 31, which in this example are uniformly distributed in the probe area 30 (FIG. 21 *b*). The spatial density distribution of the structural details is therefore constant or corresponds to a rectangular function (FIG. 21 *a*). However, the resulting sampling function of the probe area 30 is not constant but runs though a pronounced maximum in the centre of the probe area 30 (FIG. 21 *c*).

Figure 22:
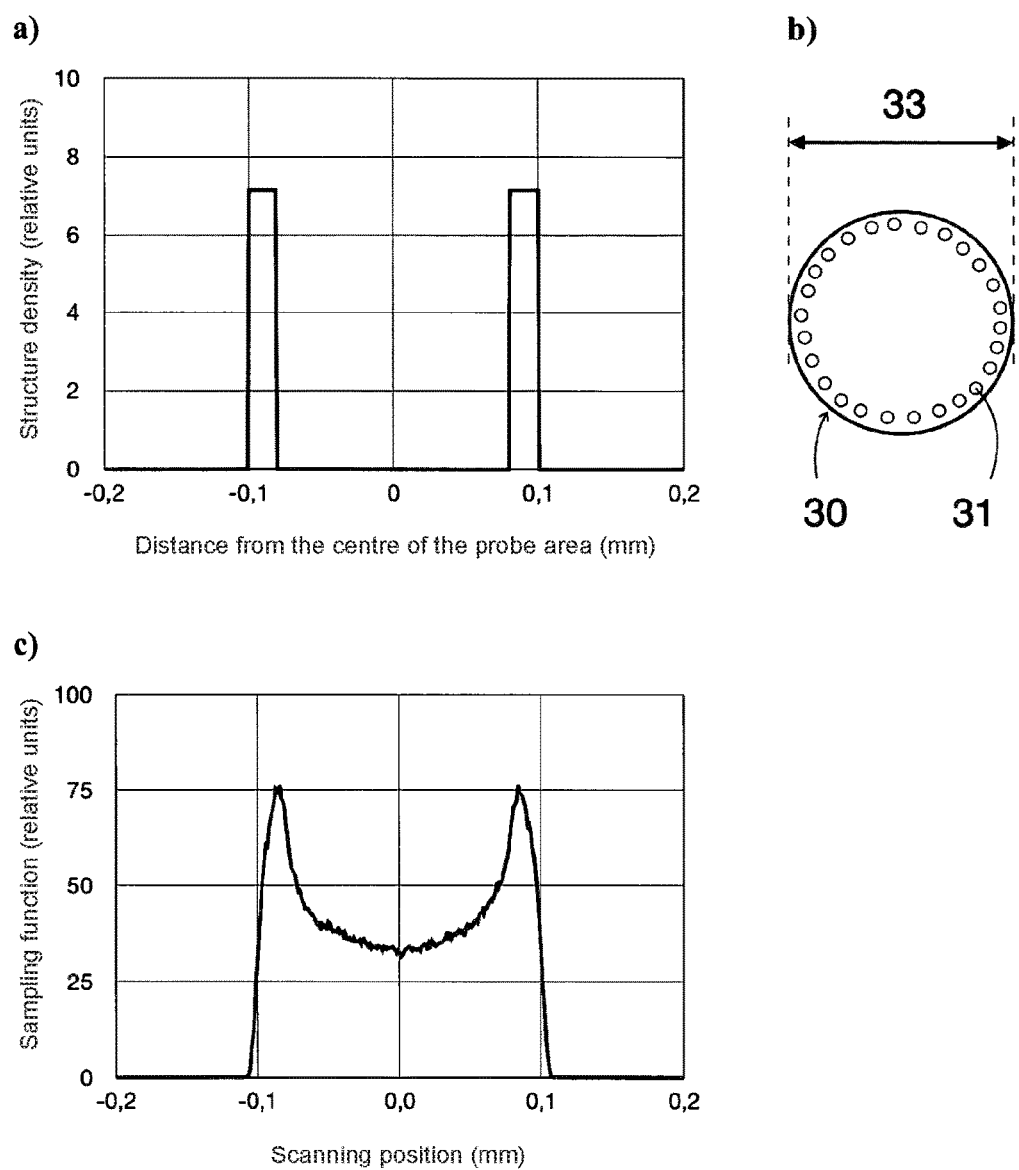
FIG. 22: A schematic cross-sectional representation of a spherical probe area with light-deflecting structuring having structural details only in an outer spherical shell of the probe area (b), a schematic representation of the distribution density of the structural details (a), and a simulation of the resulting sampling function for a probe area having this structuring (c).
Figure 23:
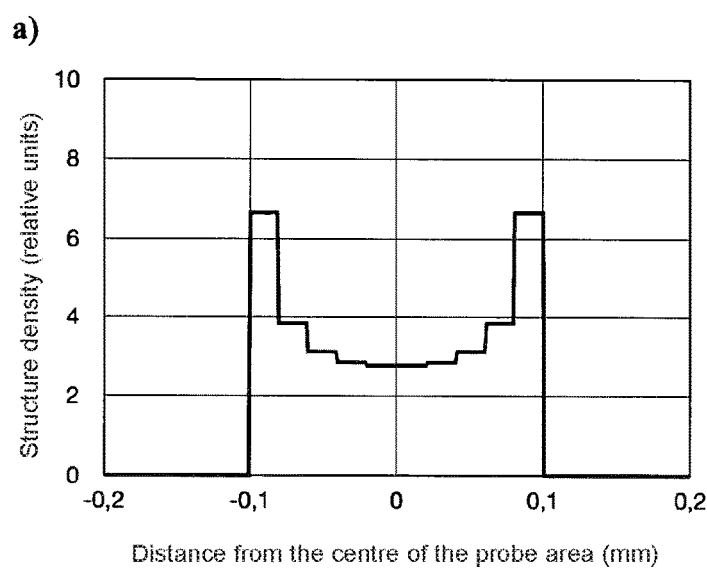
FIG. 23: A schematic cross-sectional representation of a spherical probe area with light-deflecting structuring in which the distribution density of the structural details at the edge of the probe area is at maximum and decreases toward the centre of the probe area (b), a schematic representation of the distribution density of the structural details (a), and a simulation of the resulting approximately rectangular sampling function for a probe area having this structuring (c).
Figure 23:
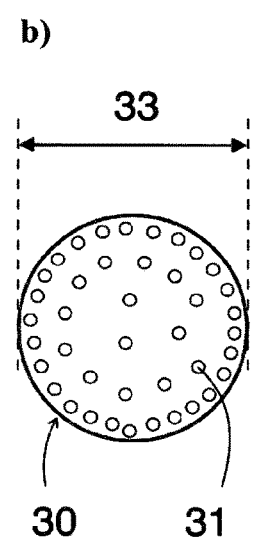
Figure 23:
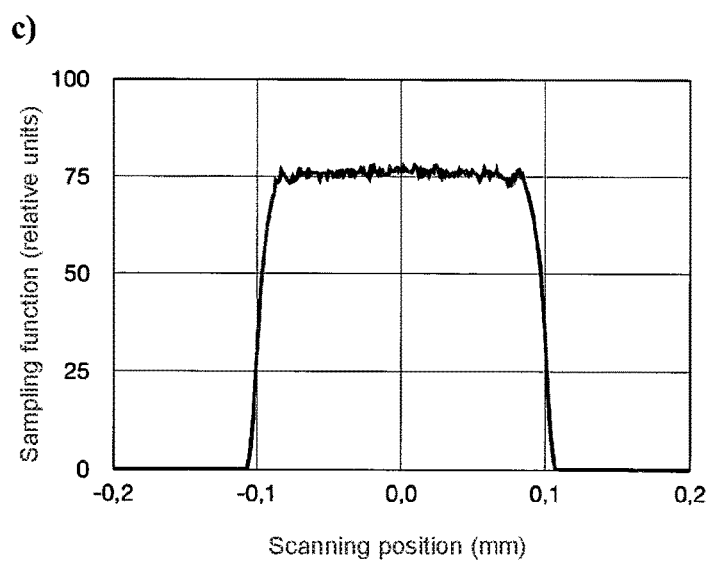
Figure 24:
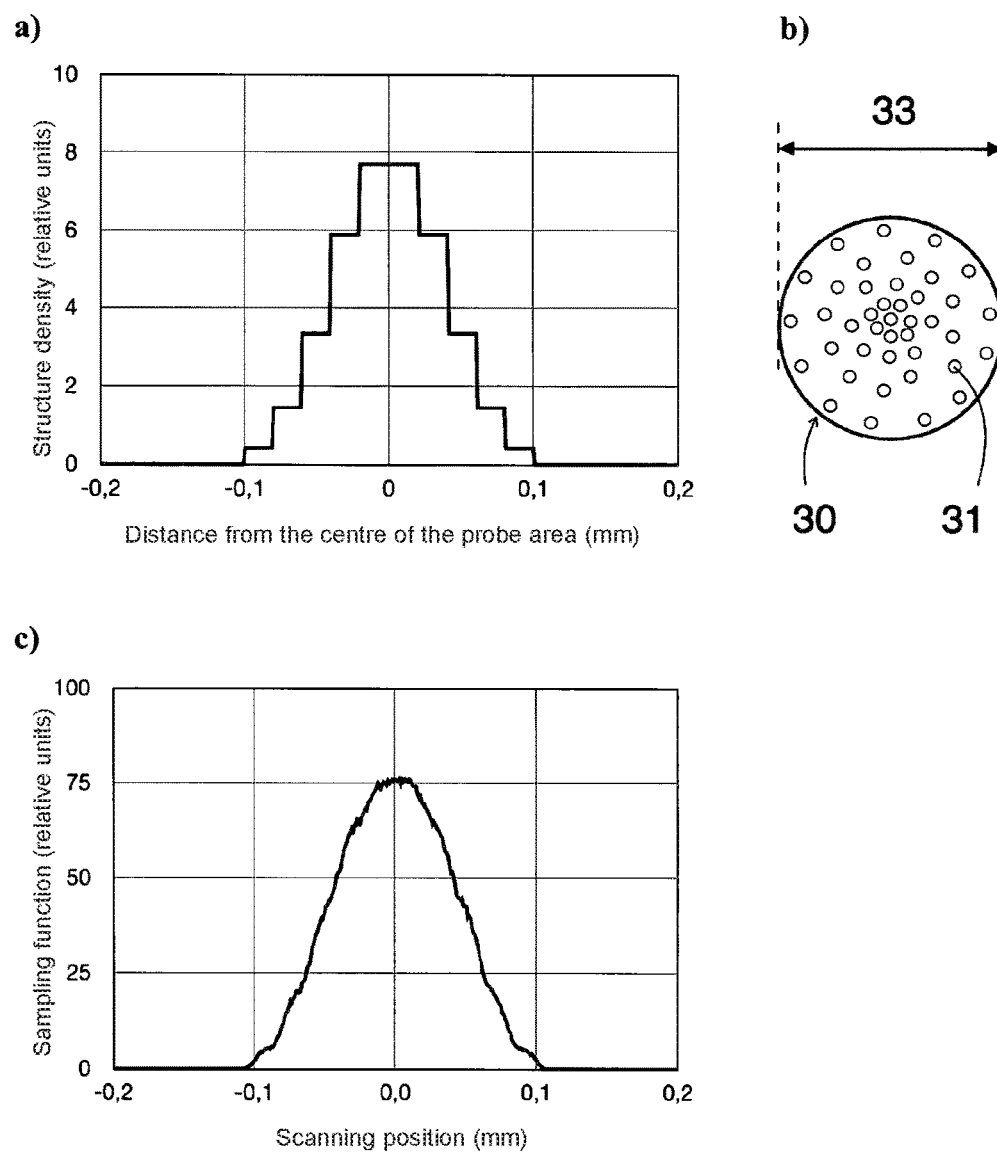
FIG. 24: A schematic cross-sectional representation of a spherical probe area having light-deflecting structuring in which the distribution density of the structural details in the centre of the probe area is at maximum and decreases toward the edge of the probe area (b), a schematic representation of the distribution density of the structural details (a), and a simulation of the resulting approximately gaussian sampling function for a probe area having this structuring (c).

When the light-deflecting structuring within the probe area 30 is formed by a plurality of structural details 31, the spatial density distribution of the structural details 31 need not be constant; it may instead vary within the probe area 30, that is, the average distance between adjacent structural details 31 may be different in different sub-areas of the probe area 30. It is thus possible to influence the course [shape] of the sampling function. FIGS. 22, 23 and 24 show examples of spherical probe areas 30 having different rotationally symmetric structure-density distributions.

FIG. 22 shows schematically a probe area 30 with light-scattering structuring, in which the structural details 31 are arranged in an outer spherical shell of the probe area 30 (FIGS. 22 *a* and *b*). FIG. 22*c* shows the resulting sampling function which, in contrast to the exemplary embodiment of FIG. 21, has a pronounced minimum in the centre.

FIG. 23 shows a probe area 30 in which the structural details 31 in the area of the outer spherical shell of the probe area 30 are distributed most densely and their density decreases towards the centre of the probe area 30 (FIGS. 23 *a* and *b*). The resulting sampling function (FIG. 23 *c*) has an approximately rectangular shape and thus corresponds to the sampling function of a pinhole aperture.

In contrast to that, in FIG. 24, a probe area 30 is shown in which the structural details 31 are distributed most densely in the centre and the density decreases toward the edge of the probe area 30 (FIGS. 24*a* and *b*). Thus, a sampling function (FIG. 24 *c*) can be represented/described, which has an approximately gaussian shape.

DETAILED DESCRIPTION OF THE INVENTION

It is intended to provide a solution to the problem that current state-of-the-art devices for beam analysis when applied to light beams or very high-power laser beams are inaccurate or may be destroyed. In contrast, an apparatus for scanning light beams is to be created, which is suitable for the determination of geometric parameters of laser beams of high power or [high] power density, and which enables the determination of geometric parameters in high spatial resolution.

For the solution of the task, a device for scanning a light beam 10 is proposed, which comprises a body 20, a probe area 30 and a detector 40. The body 20 is made of an optically transparent material and has a light beam entry surface 22, a light beam exit surface 23 and a detection light exit surface 25. Through the light beam entry surface 22, the light beam 10 can enter the body 20, propagate through the body 20 and exit again at the light beam exit surface 23. The light beam entry surface 22 and the light beam exit surface 23 are for the most part smooth and polished to avoid undesired scatter light. The body 20 includes a probe area 30 having light-deflecting structuring.

The light beam 10 and the body 20 are movable relative to each other. For this purpose, the position of the light beam 10 can be controlled, for example by means of a scanner device, or the body 20 is moveable relative to the light beam 10 by means of a motion device. There are at least two different directions of movement 51, 52 provided, which are oriented approximately perpendicular to the axis 11 of the light beam 10. By means of a raster movement in the directions of movement 51 and 52, the probe area 30 of the body 20 is led through a cross-section of the light beam 10 and in this way the intensity distribution of the light beam 10 is scanned. Furthermore, a third movement direction 53 can be provided which is oriented approximately parallel to the axis 11 of the light beam 10. With a movement of the body 20 in this direction of movement 53, several cross-sections of the light beam 10 along the axis 11 can be scanned in succession.

As soon as the probe area 30 captures the light beam 10 at least partially, a fraction of the light beam 10 is deflected due to the light-deflecting structuring of the probe area 30. The deflected beam portions 15, 16, 17 can propagate in different directions. A portion of the light 17 may be deflected in directions leaving the body 20 without encountering the detector 40. Another part of the deflected light 15 propagates through the body 20, exits at the detection light exit surface 25 and is detected by the detector 40. The detector 40 is a photosensitive detector, for example a photodiode, which [which refers to detector] converts the incident light into an electrical signal. The signal from the detector 40 is recorded during the scanning movements. From the recorded signals, the intensity distribution in the cross-section of the light beam 10 or its beam profile can then be reconstructed. To avoid unwanted extraneous light on the detector 40, the detection light exit surface 25 and the detector 40 may be jointly enclosed by a cover 48.

The probe area 30 may be placed within the body 20 or directly on the surface of the body 20, for example on the light beam entry surface 22 or on the light beam exit surface 23. The probe area 30 may be formed as a volume or as surface. When scanning the light beam 10, there is an effective plane of the probe area 30 defined by the two-dimensional projection of the probe area 30 in the direction of the axis 11 of the light beam 10. The effective plane is therefore the two-dimensional projection of the probe area 30 on a plane perpendicular to the axis 11 of the light beam 10. This effective plane determines how large the sample taken from the cross-section of the light beam 10 is. In other words, effective is the plane of the probe area in the plan view from the direction of the axis of the light beam 10. This two-dimensional projection of the probe area has approximately the same dimensions in the directions of movement 51 and 52. The two-dimensional projection of the probe area 30 may therefore be, for example, a square, a circle, or a regular polygon. The probe area 30 itself can accordingly be, for example, a cuboid, a rectangular disc, a sphere, an ellipsoid, a circular disc, or an elliptical disc. Other shapes of the probe area 30 are possible as long as the two-dimensional projection of the shape in the direction of the axis 11 has similar dimensions in the two directions of movement 51, and 52.

The optically transparent material of the body 20 has a low absorption and a high thermo-mechanical stability. Preferably, the total absorbance of the light beam 10 when penetrating the body 20 is less than 0.10/or less than 1000 ppm (ppm=parts per million). Suitable materials are, for example, quartz glass, in particular synthetically produced fused silica, sapphire, as well as other crystal glasses with high transmittance. When using quartz glass, a particularly low absorption can be achieved. Many silica glasses have an absorption of less than 100 ppm/cm.

The material in the probe area 30 of the body 20 may be the same material as the optically transparent material of the body 20. Outside the probe area 30, the light beam 10 propagates undisturbed through the transparent material. Within the probe area 30, the light beam 10 is deflected by the light-deflecting structuring to a fraction in other directions. The light-deflecting effect of the structuring can be based on refraction, reflection or scattering. For this purpose, within the probe area 30, for example, the density or the refractive index of the material may have local changes. The light-deflecting structuring may also be formed by a rough interface or surface. The light-deflecting structuring can furthermore be formed by voids, cracks or other imperfections in the material. The material in the probe area 30 may also be wholly or partially a different material than the material of the body 20. The material in the probe area 30 may also have a doping. The light-deflecting structuring of the probe area 30 can also be formed by fluorescence converters in the material of the probe area 30 so that the deflected light 15 has a different wavelength than the light beam 10. The light-deflecting structuring in the probe area 30 does not have to be uniform, isotropic or spatially constant. The light-deflecting structuring in the probe area 30 may also be formed by a single or a plurality of structural details 31. A structural detail 31 may be, for example, a microscopic crack or cavity in the material, or a microscopic change in the material in terms of density, refractive index or doping.

For example, the probe area 30 may consist of only a single structural detail 31. However, the probe area 30 may also consist of a plurality of structural details 31. In this case, the structural details may partially overlap spatially, however they may be as well spaced apart. The number of structural details 31 per unit volume results in a spatial density of the structuring. The light-deflecting effect of the structuring is the greater, i.e. the deflected light portion is greater, the higher the density of the structuring. The distribution function of the spatial density of the structural details is preferably radially symmetric to the centre of the probe area 30.

One option for producing the probe area 30 is the so-called sub-surface engraving, in which a pulsed laser beam is focused within the optically transparent material on a very small, for example diffraction-limited, spot. Due to the extreme pulse power densities occurring in this process, a defect can be generated in the focused area. By exploiting nonlinear effects, the area of material change can be narrowly limited, making it possible to create defects with dimensions in the range of about 1 µm to several tens of µm. The defects generated can be voids, cracks, opacities, or even local, approximately selective/point changes in the density and/or refractive index of the material.

Another option for producing the probe area 30, in particular when the probe area 30 is arranged on the surface of the body 20, consists in selective etching. With the so-called selective laser etching particularly small and accurate structures can be generated. In selective laser etching, in a first step, local laser pulse treatment greatly increases the etch-ability of the material and, in a second step, the treated material sites are removed by chemical etching.

Due to the finite extent of the probe area 30, the time profile of the deflected light 15 impinging on the detector 40 and the signal generated therefrom by the detector 40 does not correspond exactly to the beam profile on the scanned trace of the cross-section of the light beam 10, but the detector signal is widened. The detector signal is mathematically a convolution of the sampling function of the probe area 30 with the beam profile. In FIG. 20, these relationships are shown schematically. If the width of the sampling function defined by the dimensions of the probe area is small compared to the width of the beam profile, for example 1/10 or smaller, then the influence of the sampling function can be neglected. If the width of the sampling function is comparable to the width of the beam profile, then the detector signal is significantly broadened, which reduces the accuracy of the scan. A more accurate reconstruction of the beam profile from the detector signal can be achieved by means of deconvolution of the detector signal.

In order to be able to perform a deconvolution, the sampling function of the probe area 30 is accordingly required. The sampling function is dependent on the shape and the design of the probe area 30 and on the configuration of the light-deflecting structuring of the probe area 30. The light-deflecting structuring may be formed, for example, by a plurality of structural details 31 whose mean distance between two neighbouring structural details is about the same. The spatial density distribution of the structural details 31 is approximately constant in that case. In the case of a spherical probe area 30, the probability of the scattering or deflection of the light from the light beam 10 is least at the edge of the spherical probe area 30 and greatest passing the centre of the probe area 30. FIG. 21 shows schematically the course [distribution] of the structural density and the [course [shape]] of the resulting sampling function for this example. Thus, in the case of a spherical probe area 30 with a uniform structuring within the probe area 30, a scanning function with a pronounced maximum in the centre results. In contrast, a probe area 30 with structuring only in the outer region of a spherical shell has a sampling function which is maximal at the edges and has a minimum in the centre, as shown by way of example in FIG. 22.

The invention makes it possible to implement the sampling function of the probe area 30 in the desired manner. For example, for comparison with beam profile measurements obtained by conventional devices, it may be advantageous to use a sampling function corresponding to a conventional pinhole aperture or pinhole. An pinhole aperture has a rectangular sampling function, since for each point within the opening of the aperture, the light extraction from the beam cross-section is identical. An approximately rectangular sampling function can be achieved with the device according to the invention in that the light-deflecting structuring in a spherical probe area 30 has a distribution density which is maximal at the outer edge of the probe area 30 and decreases towards the centre of the probe area 30. FIG. 23 schematically shows an example of a probe area 30 configured in this way. An approximately rectangular sampling function can also be achieved with a circular-disc-shaped probe area 30 whose structuring is formed from structural details 31 whose spatial distribution density within the circular disc-shaped probe area is approximately constant.

Other sampling functions can also be advantageous and can be represented [created] by suitable structuring of the probe area 30. When scanning light beams or laser beams 10 having for the most part a gaussian beam profile, it may be convenient to detect and scan the beam with a gaussian sampling function as well. The broadening of the detector signal can be calculated particularly easily in such cases, so that the reconstruction of the beam profile is particularly simple. An approximately gaussian sampling function can be achieved by means of a density distribution of the light-deflecting structuring in a spherical probe area 30, which is maximal in the centre of the probe area 30 and decreases strongly towards the edge of the probe area. In FIG. 24 an example of a probe area 30 with an approximately gaussian sampling function is shown schematically.

If the body 20, in particular its light beam entry surface 22 and light beam exit surface 23, are dust-laden or otherwise contaminated due to unfavourable environmental conditions, this has no significant effect on the accuracy of the measurement. Due to the short exposure time of the beam, thermo-optical changes of the body 20 are small and, due to the measurement principle, have practically no effect on the detection light generated by the probe area 30. By dust on the surfaces of the body scatter light can be generated when crossing the light beam 10. This scatter light can result in an increased background signal on the detector 40, so that a high dust load of the body can be detected on the basis of the background signal.

The invention offers significant advantages over the state of the art:

The device allows the scanning and measurement of light beams and laser beams with very high power and/or power density. Unlike conventional devices scanning with a pinhole aperture or a pinhole, the power or power density of the beam may be several orders of magnitude higher without affecting or destroying the measuring probe.

The device allows the scanning and measurement of light beams with high spatial resolution in all spatial directions.

The scanning function can be adapted to many requirements by different design of the structuring in the probe area.

The measuring probe according to the invention and the signals generated are insensitive to dust load [contamination]. A high dust load can be detected and taken into account in the signal evaluation.

In the following, further possible embodiments and developments of the invention will be described.

The body 20 may have different shapes. The body may be, for example, a cuboid or a cylinder. It may also be generally rod-shaped, the cross-sectional shape of the rod may be different: For example, rectangular, square, trapezoidal, oblique quadrangle, hexagon, octagon, circular, elliptical, extended circular, semi-circular, and the like. The body 20 may also be plate-, disc- or annular-shaped. The body 20 may be, for example, a circular disc. The circular disc may have a recess or a bore in the centre.

The spatial resolution of the scan depends on the size of the probe area 30. The smaller the probe area 30, the higher the achievable spatial resolution.

However, this also reduces the proportion of the deflected light 15 and thus the level of the detector signal. Preferably, the dimensions of the probe area 30 are smaller than the diameter of the light beam 10 to be measured. The probe area 30 may have dimensions in the direction of the directions of movement 51, 52 of at most 200 µm, for example. The diameter 33 of the probe area 30 may also be smaller, for example in the range from about 5 µm to 100 µm.

The motion device for providing a relative movement between the light beam 10 and the body 20 can be designed differently. The body 20 may, for example, be coupled to a motion device consisting of linear guides, which are arranged cartesian [as in the coordinate system. US-English] fashion, with corresponding drives. It is also intended that at least one movement direction 51 is a rotational movement about an axis of rotation 61. Since during a rotational movement the scanning tracks 34 have a curvature, it is provided that the axis of rotation 61 can have a sufficient distance 62 from the axis 11 of the light beam 10. To provide a further direction of movement 52, the axis of rotation 61 can be displaced and thus the distance 62 to the axis 11 of the light beam 10 can be changed. In a further possible embodiment, the motion device can perform an oscillation motion. The oscillation motion may be a parallel motion or a rotational movement.

The body 20 may include a detection light deflection area 36. The detection light deflection area deflects at least a portion of the beam portion 15 deflected by the probe area 30 in the direction of the detector 40. The detection light deflection area 36 may have light-deflecting structuring in the material of the body 20. The light-deflecting structuring of the detection light deflection area 36 can be carried out in a similar manner as the light-deflecting structuring of the probe area 30. The detection light deflection area 36 can also be an inclined surface of the body 20 or be formed by one or more recesses in the body 20.

Further elements for optimising the beam guidance of the deflected light component 15 by the probe area 30 can be provided between the detection light exit area 25 and the detector 40. Possible elements are devices for collecting light, deflection mirrors, light-scattering surfaces, or apertures. By means of a light collection device 44, deflected light 15 exiting from the detection light exit surface can be focused on the detector 40. Thus, the light fraction detected by the detector 40 can be increased and thus the signal level can be increased. The light collection device may also be used to image the probe area 30 directly onto the detector 40. It can thus be achieved that the detector 40 selectively detects only light that has been deflected by the probe area 30. In this way, the extraneous light suppression can be improved. The light collection device may comprise, for example, a lens, a concave mirror, a light conductor or a waveguide. The lens may be any type of lens, i.e. a spherical or aspherical single lens, a lens system, or a gradient index lens. A deflection mirror 43 may be helpful in decoupling the movement of the body 20 from the detector 40. A light-scattering surface may be beneficial for reducing or eliminating directional dependencies in detection sensitivity.

The body 20 may include one or more additional probe areas 32 in addition to the probe area 30. The further probe areas 32 have light-deflecting structuring. The light-deflecting structuring of the further probe areas 32 can be realised in a similar manner as the light-deflecting structuring of the probe area 30. Preferably, the further probe areas 32 have the same dimensions as the probe area 30. The probe area 30 and the further probe areas 32 are arranged at different positions in the body 20. In particular, the probe area 30 and the further probe areas 32 are placed at a distance to each other in the direction of movement 51. If the direction of movement 51 is generated by a rotation about the axis of rotation 61, the probe area 30 and the further probe areas 32 may, for example, have different azimuthal positions and also different radial distances from the axis of rotation 61. In this way, with a single scanning motion or with a single revolution of the body 20 several parallel or concentric scanning tracks 34 can be generated. The scanning time required to completely capture a cross-section of the light beam 10 can thereby be significantly reduced.

The body 20 may further comprise of an elongated area 35 with light-deflecting structuring. The elongated area 35 is preferably arranged mainly one-dimensionally and oriented approximately perpendicular to the axis 11 of the light beam 10. In the direction of the direction of movement 51, the elongated area 35 has a distance from the probe area 30, which is preferably larger than the diameter of the light beam 10 to be measured. Due to the light-deflecting structuring of the elongated area 35, a portion of the light beam 10 is deflected when the elongated area captures the light beam 10, and a portion of the deflected beam component propagates in the direction of the detector 40 and can be detected by the detector 40. During each scan motion, an additional signal is generated on the detector 40 which is offset in time from the detector signal generated by the probe area 30. This additional signal can be used to synchronise the detector signals from the individual scan motions. The elongated area 35 may also be embodied as an edge or a side surface of a rod-shaped body 20. The light-deflecting structuring of the elongated area 35 can be designed in a similar manner to the light-deflecting structuring of the probe area 30.

The detection light exit surface 25 may be provided with a reflection-reducing coating. The light beam entry surface 22 and/or the light beam exit surface 23 may also be provided with a reflection reducing coating, for example a single or multiple dielectric layer. However, even thin dielectric layers have very low absorptions and typically have lower laser beam damage thresholds than the carrier materials, which is why uncoated light beam entry surfaces 22 and light beam exit surfaces 23 are also proposed. In this case, the light beam 10 is not only refracted when passing the light beam entry surface 22 and the light beam exit surface 23, but also reflected to a very small extent (so-called Fresnel reflection), so that reflected light beam portions 12, 13, 14 arise. In FIGS. 14 and 15, the reflected beam portions are shown schematically. Some reflected light beam components 13 and 14 can be captured by the probe area 30 and thus lead to disturbances in the detector signal. In order to reduce or avoid the influence of reflected light beam components 13, 14, the light beam exit surface 23 may be inclined relative to the light beam 10. It is also possible to arrange the probe area 30 as close as possible to or directly on the light beam exit area 23, similar as shown in FIG. 15.

Further features and possible embodiments are shown in the figures and in the figure descriptions.

The invention is not limited to the illustrated and described embodiments. Rather, the features of individual embodiments described or shown in the figures can also be combined with one another. For example, a device in which the body 20 accommodates both further probe areas 32 and also includes an elongated area 35 with light-deflecting structuring, is within the scope of the present invention.

The invention can be used, for example, to determine the following parameters of a light beam 10: Beam diameter, beam profile, intensity distribution, power density, or integral power. If, in addition to the movement directions 51 and 52, an adjustment or drive option in the third movement direction 53, parallel to the direction of the axis 11 of the light beam 10, is provided in the motion arrangement of the device according to the invention, then the determination of the following parameters of a light beam 10 is furthermore possible: Divergence angle, beam parameter product, propagation factor, or focus position.

The invention can be used to scan very high power and/or power density laser beams. The laser beam can have a power of up to 1000 W and also substantially more, for example also 100 kW and above. In the focus, the laser beam can have a power density of up to 5 MW/cm$^2$ or even several orders of magnitude higher.

LIST OF REFERENCE NUMBERS 10 light beam
11 light beam axis
12 light beam reflected on light beam entry surface
13 light beam reflected on light beam exit surface
14 light beam reflected on light beam exit and entry surface
15 deflected beam portion in the direction of the detector
16 deflected beam portion
17 deflected beam portion
20 body made from optically transparent material
22 light beam entry surface 23 light beam exit surface
25 detection light exit surface
30 probe area
31 structural detail
32 further probe area
33 Dimension of the probe area in the direction of projection of the light beam
34 Scanning track of the probe area
35 elongated area
36 detection light deflection area
40 detector
43 deflection mirror
44 light collection device
46 aperture means
48 cover
51 Direction of movement perpendicular to the axis of the light beam
52 other direction of movement perpendicular to the axis of the light beam
53 movement direction in the direction of the axis of the light beam
61 axis of rotation
62 Distance between the axis of the light beam and the axis of rotation

The invention claimed is:

1. A device for scanning a light beam, comprising a body, a probe area and a detector,
wherein the body consists of an optically transparent material and comprises a light beam entry surface, a light beam exit surface and a detection light exit surface and wherein the light beam entry surface and the light beam exit surface are for the most part smooth and polished, wherein the body includes the probe area,
wherein the probe area has light-deflecting structuring,
wherein the detector is configured to detect at least a portion of the by the probe area deflected beam portion from the light beam, where the body and the light beam are movable in two different directions of movement perpendicular to the axis of the light beam relative to each other, and
wherein the probe area has a shape whose two-dimensional projection on a surface perpendicular to the axis of the light beam has approximately the same dimensions in the two directions of movement perpendicular to the axis of the light beam.

2. Device according to claim 1, wherein the probe area has a shape whose two-dimensional projection is radially symmetrical on a surface perpendicular to the axis of the light beam.

3. Device according to claim 1, wherein the body is rod-shaped.

4. Device according to claim 1, wherein the body is disc-shaped.

5. Device according to claim 1, wherein the light-deflecting structuring in the probe area is formed by varying the refractive index or density of a material in the probe area.

6. Device according to claim 1, wherein the light-deflecting structuring in the probe area is formed by a roughness of a surface.

7. Device according to claim 1, wherein the light-deflecting structuring in the probe area is formed by one or more voids or cracks in the material of the probe area.

8. Device according to claim 1, wherein the light-deflecting structuring in the probe area is formed by doping of a material in the probe area.

9. Device according to claim 1, wherein the light-deflecting structuring in the probe area is made by means of a focused short-pulse laser.

10. Device according to claim 1, wherein the probe area is spherical.

11. Device according to claim 1, wherein the light-deflecting structuring in the probe area is formed by a plurality of structural details, whose spatial density distribution within the probe area is radially symmetrical or is rotationally symmetrical.

12. Device according to claim 1, wherein the optically transparent material of the body has an absorption of less than 100 ppm/cm in the range of the wavelength of the light beam to be scanned.

13. Device according to claim 1, wherein the body has a detection light deflection area, which deflects at least a portion of the deflected beam portion from the probe area in the direction of the detector.

14. Device according to claim 13, wherein the detection light deflection area is formed by light-deflecting structuring.

15. Device according to claim 13, wherein the detection light deflection area is formed by one or more recesses in the body.

16. Device according to claim 13, wherein the detection light deflection area is formed by an inclined surface of the body.

17. Device according to claim 1, wherein the body is stationary and the light beam is movable relative to the body.

18. Device according to claim 1, wherein the body is movable relative to the light beam.

19. Device according to claim 18, wherein a direction of movement for scanning the light beam is generated by rotation of the body about an axis of rotation having a distance to the axis of the light beam.

20. Device according to claim 19, wherein another direction of movement for scanning the light beam is generated by changing the distance of the axis of rotation to the axis of the light beam.

21. Device according to claim 18, wherein a direction of movement for scanning the light beam is generated by a oscillation motion of the body.

22. Device according to claim 1, wherein the body is movable in a direction along the axis of the light beam.

23. Device according to claim 1, wherein a light collection device is arranged between the detection light exit surface of the body and the detector, and wherein the light collection device comprises at least one of the following elements: a lens, a gradient index lens, a concave mirror, a light conductor, or a waveguide.

24. Device according to claim 1, wherein the body includes further probe areas located at different positions for generating several parallel or concentric scanning tracks.

25. Device according to claim 1, wherein the body includes an elongated area having light-deflecting structuring, and wherein the elongated area is basically one-dimensional, has a distance to the probe area in the direction of a direction of movement, and is oriented perpendicular to the axis of the light beam.

26. Use of the device according to claim 1 for the determination of at least one of the following parameters of the light beam: Beam diameter, beam profile, intensity distribution in the cross-section of the light beam, divergence angle, beam parameter product, propagation factor, focus position.

* * * * *